US008225235B2

(12) United States Patent
Takeda et al.

(10) Patent No.: US 8,225,235 B2
(45) Date of Patent: Jul. 17, 2012

(54) REPRODUCTION APPARATUS AND REPRODUCTION METHOD

(75) Inventors: Naoko Takeda, Tokyo (JP); Kissei Matsumoto, Kanagawa (JP); Takashi Kumagai, Tokyo (JP); Toshihide Ooba, Kanagawa (JP); Hiroshi Iwata, Tokyo (JP); Shingo Yamade, Tokyo (JP)

(73) Assignee: Sony Corporation, Tokyo (JP)

( * ) Notice: Subject to any disclaimer, the term of this patent is extended or adjusted under 35 U.S.C. 154(b) by 316 days.

(21) Appl. No.: 11/171,493

(22) Filed: Jun. 30, 2005

(65) Prior Publication Data

US 2006/0010099 A1 Jan. 12, 2006

(30) Foreign Application Priority Data

Jun. 30, 2004 (JP) .............................. P2004-193277

(51) Int. Cl.
*G06F 3/048* (2006.01)

(52) U.S. Cl. ........ 715/854; 715/864; 715/810; 715/811; 715/812; 715/813; 715/814; 715/716; 715/727; 715/728

(58) Field of Classification Search .................. 715/854, 715/864, 716, 728
See application file for complete search history.

(56) References Cited

U.S. PATENT DOCUMENTS

| | | | |
|---|---|---|---|
| 5,544,360 A | 8/1996 | Lewak et al. | |
| 5,852,593 A | 12/1998 | Ishida et al. | |
| 5,945,987 A | 8/1999 | Dunn | |
| 6,262,724 B1 * | 7/2001 | Crow et al. | 715/723 |
| 6,522,347 B1 * | 2/2003 | Tsuji et al. | 715/848 |
| 6,760,721 B1 | 7/2004 | Chasen et al. | |
| 6,928,433 B2 | 8/2005 | Goodman et al. | |
| 6,996,563 B2 * | 2/2006 | Kumagai et al. | 707/10 |
| 7,017,125 B1 * | 3/2006 | Matsumoto | 715/864 |
| 7,166,791 B2 | 1/2007 | Robbin et al. | |
| 7,216,008 B2 * | 5/2007 | Sakata | 700/94 |
| 7,219,308 B2 * | 5/2007 | Novak et al. | 715/768 |
| 2001/0002223 A1 | 5/2001 | Watanabe | |
| 2002/0141096 A1 | 10/2002 | Hayashi | |
| 2002/0147728 A1 | 10/2002 | Goodman et al. | |
| 2002/0160749 A1 | 10/2002 | Nishikawa | |
| 2002/0171691 A1 * | 11/2002 | Currans et al. | 345/864 |
| 2002/0178276 A1 * | 11/2002 | McCartney et al. | 709/231 |
| 2003/0069854 A1 | 4/2003 | Hsu et al. | |
| 2003/0158737 A1 * | 8/2003 | Csicsatka | 704/273 |
| 2004/0055446 A1 * | 3/2004 | Robbin et al. | 84/615 |

(Continued)

FOREIGN PATENT DOCUMENTS

EP 1480219 A1 11/2004

(Continued)

*Primary Examiner* — Doon Chow
*Assistant Examiner* — Anil Kumar
(74) *Attorney, Agent, or Firm* — Wolf, Greenfield & Sacks, P.C.

(57) ABSTRACT

To provide a reproduction apparatus able to easily select a desired content data based on an attribute of the content data by a simple operation from a user and a reproduction method for the same, wherein the reproduction apparatus having: a display displaying the item; a first operation unit instructing a switch of the attribute; a second function unit instructing a selection of a predetermined item on the display; and a processing unit switching a first screen from a screen of a plurality of items so as to display a plurality of items when the first operation key is operated, and switching to a second screen displaying a plurality of item when the second operation key is operated when a plurality of item is displayed on the first screen.

17 Claims, 15 Drawing Sheets

U.S. PATENT DOCUMENTS

| | | |
|---|---|---|
| 2004/0075698 A1 * | 4/2004 | Gao et al. .................. 345/854 |
| 2005/0049941 A1 | 3/2005 | Kaplan |
| 2005/0187976 A1 | 8/2005 | Goodman et al. |
| 2005/0204309 A1 * | 9/2005 | Szeto ........................ 715/811 |
| 2006/0010099 A1 * | 1/2006 | Takeda et al. ................ 707/1 |
| 2006/0235550 A1 | 10/2006 | Csicsatka et al. |
| 2007/0008830 A1 | 1/2007 | Tsukazaki et al. |
| 2007/0027923 A1 | 2/2007 | Tsukazaki et al. |
| 2007/0031116 A1 | 2/2007 | Takatsuka et al. |
| 2007/0038941 A1 | 2/2007 | Wysocki et al. |

FOREIGN PATENT DOCUMENTS

| | | |
|---|---|---|
| IF | 10-290413 | 10/1998 |
| JP | 05-282788 A | 10/1993 |
| JP | 05-325404 A | 12/1993 |
| JP | 07-153244 | 6/1995 |
| JP | 09-265731 | 10/1997 |
| JP | 2993058 B2 | 12/1999 |
| JP | 2000-299829 A | 10/2000 |
| JP | 3099373 B2 | 10/2000 |
| JP | 2001-076415 A | 3/2001 |
| JP | 2001-243748 | 9/2001 |
| JP | 2001-309222 A | 11/2001 |
| JP | 3239383 B2 | 12/2001 |
| JP | 2002-222582 A | 8/2002 |
| JP | 2002-343067 A | 11/2002 |
| JP | 2003-157335 A | 5/2003 |
| JP | 2003-186755 A | 7/2003 |
| JP | 2003-203133 A | 7/2003 |
| JP | 2003-219325 A | 7/2003 |
| JP | 2004-039113 A | 2/2004 |
| JP | 2004-127465 A | 4/2004 |
| JP | 2004-302931 A | 10/2004 |
| JP | 2004-326907 A | 11/2004 |
| JP | 2004-342193 A | 12/2004 |
| JP | 2005-094277 A | 4/2005 |
| JP | 2005-116068 A | 4/2005 |

* cited by examiner

REPRODUCTION SCREEN D3

SETTING SCREEN D2

SELECTION SCREEN D1

FIG. 5

| KEY | MUSIC SELECTION SCREEN D1 | | REPRODUCTION SCREEN D3 | | SETTING SCREEN D2 | |
|---|---|---|---|---|---|---|
| | SHORT PRESSING ACTION | LONG PRESSING ACTION | SHORT PRESSING ACTION | LONG PRESSING ACTION | SHORT PRESSING ACTION | LONG PRESSING ACTION |
| UP DIRECTION | CURSOR UP | CONTINUOUS UP | CURSOR UP | CONTINUOUS UP | CURSOR UP | CONTINUOUS UP |
| DOWN DIRECTION | CURSOR DOWN | CONTINUOUS DOWN | CURSOR DOWN | CONTINUOUS DOWN | CURSOR DOWN | CONTINUOUS DOWN |
| RIGHT DIRECTION | LEVEL DOWN | - | + SEARCH BEGINNING | FAST-FORWARD | LEVEL DOWN | - |
| LEFT DIRECTION | LEVEL UP | - | - SEARCH BEGINNING | FAST-RETURN | LEVEL UP | - |
| EXECUTE PLAY/ENTER /STOP | REPRODUCE ITEM OF CURSOR POSITION | STOP REPRODUCTION | PLAY/STOP | PLAY/STOP | ENTER | ENTER |
| MODE | SWITCH MUSIC SELECTION SCREEN | PROCEED TO REPRODUCTION SCREEN | PROCEED TO MODE | PROCEED TO MUSIC SELECTION SCREEN | PROCEED TO MODE | RETURN TO MUSIC SELECTION SCREEN OR REPRODUCTION SCREEN |
| MENU | PROCEED TO SETTING SCREEN | POWER OFF | PROCEED TO SETTING SCREEN | POWER OFF | PROCEED TO TOP MENU IN SETTING SCREEN | POWER OFF |
| VOL+ | VOLUME UP | CONTINUOUS UP | VOLUME UP | CONTINUOUS UP | VOLUME UP | CONTINUOUS UP |
| VOL- | VOLUME DOWN | CONTINUOUS DOWN | VOLUME DOWN | CONTINUOUS DOWN | VOLUME DOWN | CONTINUOUS DOWN |
| HOLD | HOLD | | HOLD | | HOLD | |

FIG. 10

| DEPTH MODE NAME | DEPTH 1 | DEPTH 2 | DEPTH 3 |
|---|---|---|---|
| ARTIST MODE | ARTIST | ALBUM | TRACK |
| ALBUM MODE | ALBUM | TRACK | NONE |
| GENRE MODE | GENRE | ARTIST | TRACK |
| GROUP MODE | GROUP | TRACK | NONE |
| OTHERS MODE | NEW TRACKS | GROUP | TRACK |
| | BOOKMARK | TRACK | NONE |

REPRODUCTION APPARATUS AND REPRODUCTION METHOD

CROSS REFERENCE TO RELATED APPLICATION

The present invention contains subject matter related to Japanese Patent Application No. 2004-193277 filed in the Japan Patent Office on Jun. 30, 2004, the entire content of which being incorporated herein by reference.

BACKGROUND OF THE INVENTION

1. Field of the Invention

The present invention relates to a reproduction apparatus prompting selection of content data by a selection screen and a reproduction method for the same.

2. Description of the Related Art

In recent year, advances in technology increasing the capacity of recording media and compressing music, moving images, still images, and other data have enabled the recording media used in portable players etc. to store enormous amounts of content data.

Due to the increase of the amount of content data able to be stored in recording media in this way, a system enabling a user to efficiently search for the desired content data on a screen of the a reproduction apparatus and reproduce it has become requested.

One system manages music data using a hierarchical tree structure based on attributes of the music data such as the genre, artists, and albums and prompts the user to select the attributes in order from the topmost layer of the tree down to select the music data at the bottommost layer.

This is described for example in Japanese Unexamined Patent Publication (Kokai) No. 2001-76415.

SUMMARY OF THE INVENTION

This system of the related art can reduce the number of the content data of the attribute of the bottommost layer if increasing the number of the attributes used as layers of the tree structure, however, this increases the number of operations for moving down in the hierarchy, so complicates the operation.

Further, to simplify the operation for selection of the content data, assignment of specific functions to the operation keys of the reproduction apparatus is important from the viewpoint of restricting the number of the operations keys and the operability.

It is therefore desirable to provide a reproduction apparatus enabling easy selection of desired content data based on its attributes by simple user operation and a reproduction method for the same.

According to an embodiment of the present invention, there is provided a reproduction apparatus for reproducing content data for which specific items are defined for each of a plurality of different attributes, the reproduction apparatus having a display displaying the items; a first operation means for instructing and switching of the attributes; a second operation means for instructing selection of a predetermined item from a plurality of items displayed on the display; and a processing means for switching a first screen from a display of a plurality of items for a predetermined attribute to a display of a plurality of items for an attribute different from the predetermined attribute when the first operation key is operated and switching to a second screen displaying a plurality of items for an attribute different from the predetermined attribute corresponding to an item selected on the first screen when the second operation key is operated when a plurality of items for the predetermined attribute is displayed on the first screen.

According to an embodiment of the present invention, there is provided a reproduction method for reproducing content data for which specific items are defined for each of a plurality of different attributes, the reproduction method having a first step of switching a first screen from a display of a plurality of items for a predetermined attribute to a display of a plurality of items for an attribute different from the predetermined attribute when the first operation key is operated and a second step of switching to a second screen displaying a plurality of items for an attribute different from the predetermined attribute corresponding to an item selected on the first screen when a second operation key is operated when a plurality of items for the predetermined attribute is displayed on the first screen by the first step.

According to an embodiment of the present invention, there is provided a reproduction apparatus for reproducing content data for which specific items are defined for each of a plurality of different attributes, the reproduction apparatus having a display displaying the items; a first operation key instructing switching of the attributes; a second operation key instructing selection of a predetermined item from a plurality of items displayed on the display; and a processing circuit switching a first screen from a display of a plurality of items for a predetermined attribute to a display of a plurality of items for an attribute different from the predetermined attribute when the first operation key is operated and for switching to a second screen displaying a plurality of items for an attribute different from the predetermined attribute corresponding to an item selected on the first screen when the second operation key is operated when a plurality of items for the predetermined attribute is displayed on the first screen.

According to the reproduction apparatus of the embodiment of the present invention, it is possible for a user to easily select the desired content data based on its attributes by a simple operation.

According to the reproduction method of the embodiment of the present invention, it is possible for a user to easily select the desired content data based on its attributes by a simple operation.

BRIEF DESCRIPTION OF THE DRAWINGS

These features of embodiments of the present invention will be described in more detail with reference to the accompanying drawings, in which:

FIG. 5 is a view for illustrating functions of the operation keys shown in FIGS. 2A to 2C;

FIG. 10 is a view for illustrating the transition of the music selection screen displayed on the LCD panel shown in FIG. 1;

DESCRIPTION OF THE PREFERRED EMBODIMENTS

Hereinafter, preferred embodiments of the present invention will be explained with reference to the drawings.

First, a reproduction apparatus according to the present embodiment will be explained.

Figure 1:
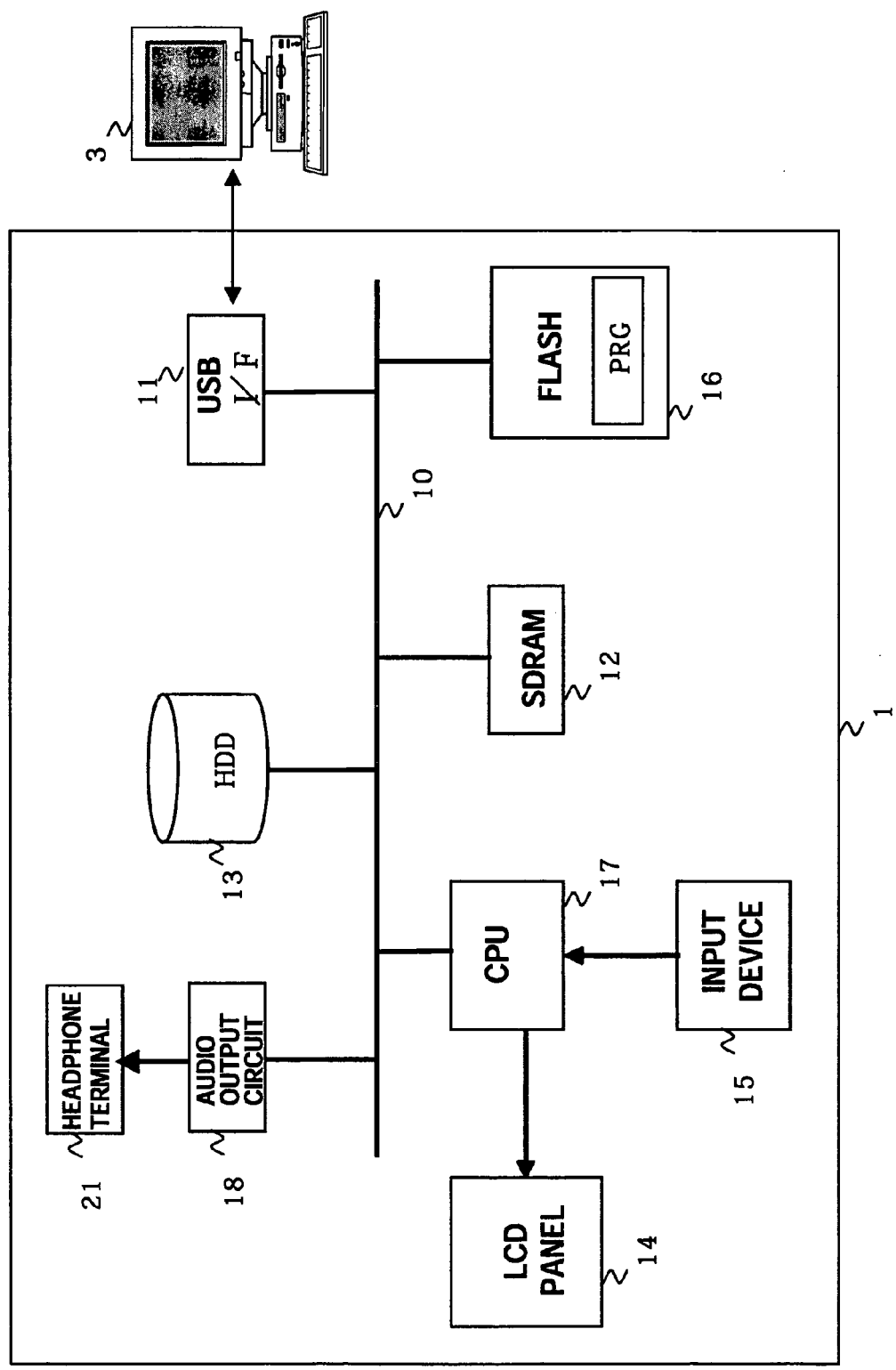
FIG. 1 is a view of a configuration of a reproduction apparatus according to an embodiment of the present invention.

FIG. 1 is a view of a configuration of a reproduction apparatus 1 according to the present embodiment.

The reproduction apparatus 1 is for example a portable type audio player.

As shown in FIG. 1, the reproduction apparatus 1 for example has a universal serial bus (USB) interface 11, a synchronous dynamic random access memory (SDRAM) 12, a hard disk drive (HDD) 13, an LCD panel 14, an input device 15, a flash memory 16, a central processing unit (CPU) 17, and an audio output circuit 18.

The USB interface 11, the SDRAM 12, the HDD 13, the flash memory 16, the CPU 17, and the audio output circuit 18 are for example connected via a data line 10.

The USB interface 11, the SDRAM 12, the HDD 13, the LCD panel 14, the input device 15, the flash memory 16, the CPU 17, and the audio output circuit 18 are held in a flat box-shaped housing.

The USB interface 11 is connected to a personal computer 3 and inputs and outputs data with the personal computer 3.

The SDRAM 12 temporarily stores data for processing of the CPU 17.

The HDD 13 stores compressed music data.

The music data is written via the USB interface 11 from the personal computer 3 to the HDD 13.

The HDD 13 has for example a storage capacity of 20 GB and can store music data of almost 100 million tracks (700 compact disks' worth of data) compressed by adaptive transform acoustic coding (ATRAC) 3 etc.

Each track's worth of music data stored in the HDD 13 (hereinafter simply referred to as "music data") is assigned attribute data concerning the artist, album, genre, group, new tracks, bookmarks, etc.

The artist attribute data indicates the artist performing the music of the music data.

The album attribute data indicates the album to which the music data belongs.

The genre attribute data indicates the genre to which the music of the music data belongs.

The group attribute data indicates which group defined on the personal computer 3 the music data belongs to.

The new track attribute data indicates whether or not the music data was input from the personal computer 3 when the reproduction apparatus 1 was connected to the personal computer 3 the last time.

The bookmark attribute data indicates whether the music data was bookmarked by the user.

Figure 2A:
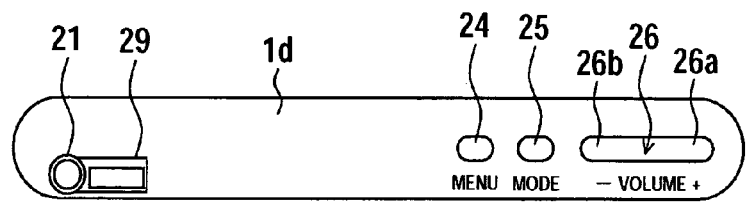
FIGS. 2A to 2C are views for illustrating an outer appearance of the reproduction apparatus shown in FIG. 1.
Figure 2B:
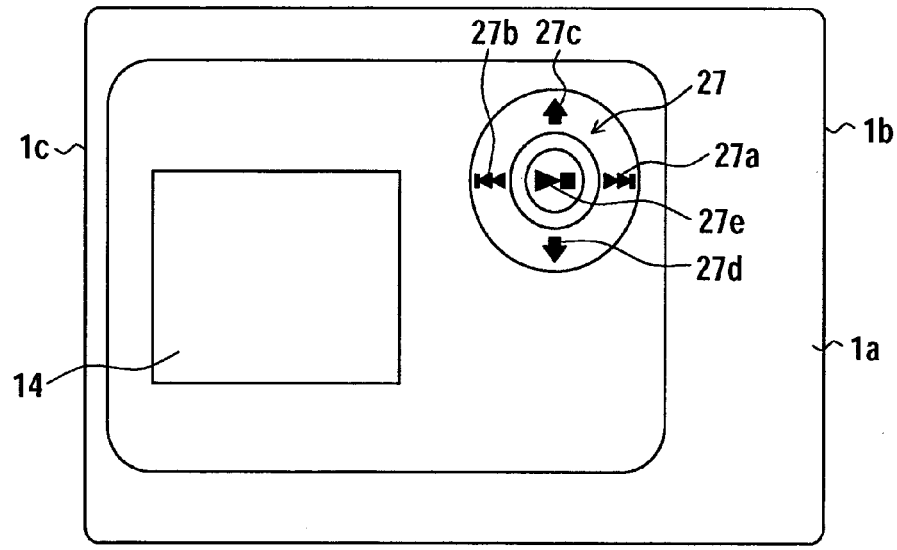

The LCD panel 14 is positioned at a front 1a of the housing of the reproduction apparatus 1 toward an end 1c from the middle of the front 1a as shown in FIG. 2B.

The LCD panel 14 displays various screens by the CPU 17.

Figure 3:
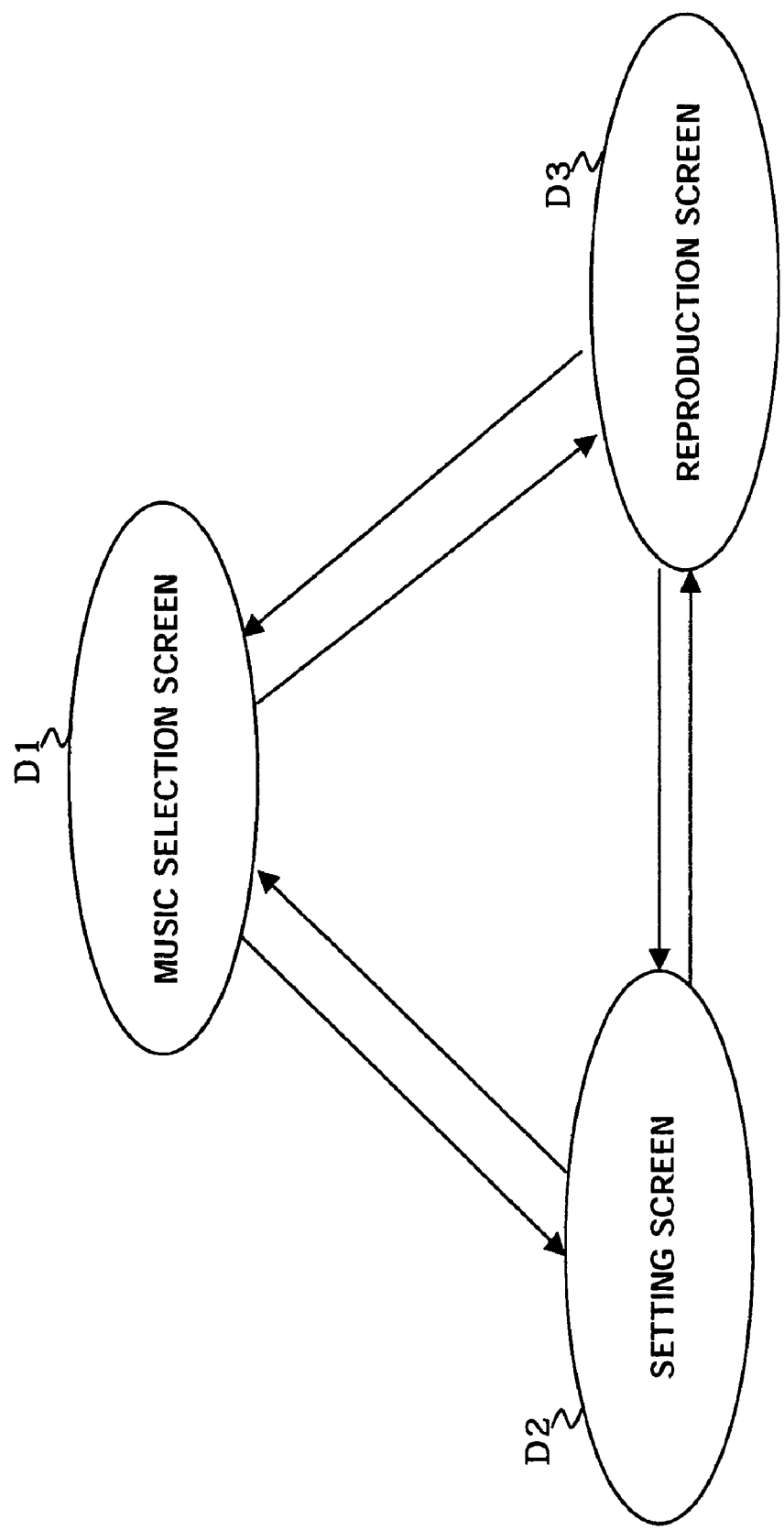
FIG. 3 is a view for illustrating a transition of a screen of liquid crystal display (LCD) panel shown in FIG. 1.

As the screens displayed on the LCD panel 14, there are for example mainly a music selection screen D1, a setting screen D2, and a reproduction screen D3 as shown in FIG. 3. These screens switch (shift) in accordance with key operation by the user.

Figure 4C:
FIGS. 4A to 4C are views for illustrating various screens displayed on the LCD panel shown in FIG. 1.
Figure 4B:
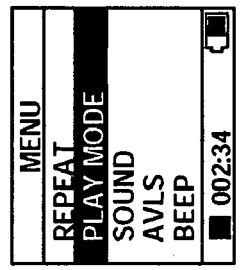
Figure 4A:
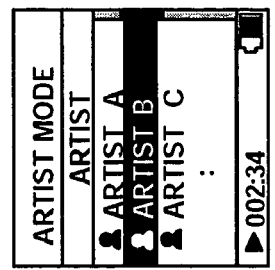

The music selection screen D1 displays a plurality of items concerning the artist attribute data, for example, the artists A, B, C . . . as shown in FIG. 4A and prompts the user to select an item.

The music selection screen D1 is switched to a lower layer music selection screen D1 defined for each attribute data by selection of an item as explained below.

The setting screen D2 for example displays "Repeat", "Play Mode", "Sound", "AVLS", "Beep", and other items as shown in FIG. 4B.

"Play Mode" is designated (selected) when selecting the play mode as explained below.

Note that the setting screen D2 may be scrolled downward to display in addition to the above items "Contrast", "Backlight", "Reverse Display", "Language", "Format", and other items.

The reproduction screen D3 displays the title, album, artist, genre, and other attribute data of the music data selected for reproduction, its reproduction rate, and other data.

The input device 15 includes the keys provided at the housing of the reproduction apparatus 1 and operated by a user.

Figure 2C:
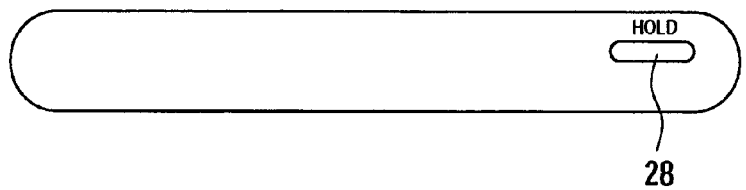

The input device 15 for example includes a remote control terminal 29, a MENU key 24, a MODE key 25, a VOLUME key 26, a direction key 27, and a HOLD key 28 as shown in FIGS. 2A to 2C.

The MENU key 24, the MODE key 25, the VOLUME key 26, the direction key 27, and the HOLD key 28 output operation signals corresponding to pressing actions and other operations from the user to the CPU 17.

The MENU key 24 is used for displaying the setting screen D2 on the LCD panel 14.

The MODE key 25 is used for displaying and switching the music selection screen D1 as explained below.

The VOLUME key 26 is used for adjusting the volume defined by the audio signal output from a headphone terminal 21 to a headphone (not shown).

The VOLUME key 26 has a volume plus key 26a and a volume minus key 26b.

The direction key 27 has a right direction key 27a, a left direction key 27b, an up direction key 27c, a down direction key 27d, and an execute key 27e.

The right direction key 27a and the left direction key 27b are for example used for switching the level of the music selection screen D1 as explained below.

The up direction key 27c and the down direction key 27d are used for making a cursor move up or down on the music selection screen D1 and the setting screen D2.

The execute key 27e is used for selecting the item where the cursor is placed and inputting a reproduction instruction.

As shown in FIG. 2A, the MENU key 24, the MODE key 25, the VOLUME key 26, the headphone terminal 21, and the remote control terminal 29 are arranged at a side face 1d of the housing of the reproduction apparatus 1 in the thickness direction. In the present embodiment, the housing is a flat box shape, so the side face 1d perpendicularly adjoins the front 1a.

The MENU key 24, the MODE key 25, and the VOLUME key 26 are arranged in that order from a point toward the end 1b side from the middle of the side face 1d toward the end 1b. Note that the end 1b is arranged facing an end 1a. Further, the VOLUME key 26 has a larger area than the MENU key 24 and the MODE key 25.

Further, as shown in FIG. 2B, the direction key 27 is arranged on the front 1a at a position toward the end 1b side and the side face 1d side from the center.

The flash memory 16 for example stores a program PRG defining the operation of the CPU 17.

The CPU 17 centrally controls the operation of the reproduction apparatus 1 based on the program PRG read out from the flash memory 16.

The CPU 17 performs processing to display the music selection screen D1, the setting screen D2, and the reproduction screen D3 shown in FIGS. 4A to 4C on the LCD panel 14.

Further, the CPU 17 reads out the selected music data from the HDD 13, decodes it, and reproduces it.

The audio output circuit 18 outputs an audio signal in accordance with the music data decoded by the CPU 17 to the headphone terminal 21.

Next, the functions of each of the operation keys shown in FIGS. 2A to 2C will be explained.

FIG. 5 is a view illustrating the functions of the operation keys.

In FIG. 5, the vertical direction shows the operation keys, and the horizontal direction shows the screens displayed on the LCD panel 14 when the operation keys are pressed and whether the operation keys were pressed for a short time or long time.

Note that, a short pressing action indicates the case of pressing an operation key for less than a predetermined time such as 2 seconds, while a long pressing indicates the case of pressing an operation key for more than that predetermined time.

The following processing is executed by the CPU shown in FIG. 1 based on the operation signals from the operation keys.

As shown in FIG. 5, when the up direction key 27c is pressed for a short time during display of the music selection screen D1 or the setting screen D2, the CPU 17 makes the cursor move upward on the screen of the LCD panel 14.

When the up direction key 27c is pressed for a long time during display of the music selection screen D1 or the setting screen D2, the CPU 17 makes the cursor move continuously upward on the screen of the LCD panel 14.

When the up direction key 27c is pressed for a short time during display of the reproduction screen D3, the CPU 17 makes the cursor move upward on the screen of the LCD panel 14.

When the up direction key 27c is pressed for a long time during display of the reproduction screen D3, the CPU 17 enters or cancels a bookmark of the music data at the position of the cursor on the LCD panel 14.

The processing when the down direction key 27d is pressed is the same as that when the up direction key 27c is pressed except that the direction of movement of the cursor becomes downward.

When the right direction key 27a is pressed for a short time during display of the music selection screen D1 or the setting screen D2, the CPU 17 shifts the attribute of the music selection screen displayed on the LCD panel 14 to a lower layer.

Further, when the right direction key 27a is pressed for a short time during display of the reproduction screen D3, the CPU 17 finds the beginning of music data in a forward direction.

Furthermore, when the right direction key 27a is pressed for a long time during display of the reproduction screen D3, the CPU 17 performs a fast-forward operation.

When the left direction key 27b is pressed for a short time during display of the music selection screen D1 or the setting screen D2, the CPU 17 shifts the attribute of the music selection screen displayed on the LCD panel 14 to an upper layer.

Further, when the left direction key 27b is pressed for a short time during display of the reproduction screen D3, the CPU 17 finds the beginning of the music data in a reverse direction.

Furthermore, when the left direction key 27b is pressed for a long time during display of the reproduction screen D3, the CPU 17 performs a fast return operation.

When the execute key 27e is pressed for a short time during display of the music selection screen D1, the CPU 17 reproduces the item where the cursor is placed on the LCD panel 14.

When the execute key 27e is pressed for a long time during display of the music data screen D1, the CPU terminates the reproduction.

When the execute key 27e is pressed for a long or short time during display of the reproduction screen D3, the CPU 17 starts or terminates the reproduction.

When the execute key 27e is pressed for a long or short time during display of the setting screen D2, the CPU performs an input (ENTER) operation.

When the MODE key 25 is pressed for a short time during display of the music selection screen D1, the CPU 17 switches the music selection screen D1 as explained below.

When the MODE key 25 is pressed for a long time during display of the music selection screen D1, the CPU 17 displays the reproduction screen D3 on the LCD panel 14.

When the MODE key 25 is pressed for a short time during display of the reproduction screen D3, the CPU 17 displays a first level music selection screen D1 corresponding to the reproduction screen on the LCD panel 14 as explained below.

When the MODE key 25 is pressed for a long time during display of the reproduction screen D3, the CPU 17 displays the last displayed music selection screen on the LCD panel 14.

When the MODE key 25 is pressed for a short time during display of the setting screen D2, the CPU 17 displays the first level music selection screen D1 on the LCD panel 14.

When the MODE key 25 is pressed for a long time during display of the setting screen D2, the CPU 17 displays the last displayed music selection screen on the LCD panel 14.

When the MENU key 24 is pressed for a short time during display of the music selection screen D1 or the reproduction screen D3, the CPU 17 displays the setting screen D2 on the LCD panel 14.

When the MENU key 24 is pressed for a long time during display of the music selection screen D1, the reproduction screen D3, or the setting screen D2, the CPU 17 turns off the power to the reproduction apparatus 1.

When the MENU key 24 is pressed for a short time during display of the setting screen D2, the CPU displays a top menu of the setting screen D2 on the LCD panel 14.

When the volume plus key 26a is pressed for a short time during display of the music selection screen D1, the reproduction screen D3, or the setting screen D2, the CPU 17 increases the reproduction volume.

When the volume plus key 26a is pressed for a long time during display of the music selection screen D1, the reproduction screen D3, or the setting screen D2, the CPU 17 continuously increases the reproduction volume.

When the volume minus key 26b is pressed for a short time during display of the music selection screen D1, the reproduction screen D3, or the setting screen D2, the CPU 17 decreases the reproduction volume.

When the volume minus key 26b is pressed for a long time during display of the music selection screen D1, the reproduction screen D3, or the setting screen D2, the CPU 17 continuously decreases the reproduction volume.

When the HOLD key 28 is pressed for a short or long time during display of the music selection screen D1, the reproduction screen D3, or the setting screen D2, the CPU 17 shifts to a HOLD state invalidating all key operation.

Next, the music selection screen D1 will be explained.

For the music selection screen D1, a plurality of first level music selection screens defined for the various attributes, namely, the attributes concerning the music data, and displaying pluralities of items defined for the attributes for selection are defined.

Further, for the music selection screen D1, second level and lower music selection screens for the corresponding first level music selection screens are defined.

The second level and lower music selection screens are defined for corresponding items of the first level music selection screens and have pluralities of items for classifying the music data belonging to the items based on attributes other than the attributes corresponding to the items.

Note that, the first level music selection screens D1 are labeled as "Depth 1", the second level music selection screens D1 are labeled as "Depth 2", and the third level music selection screens D1 are labeled as "Depth 3".

First, the first level music selection screens D1 will be explained.

Figure 6:
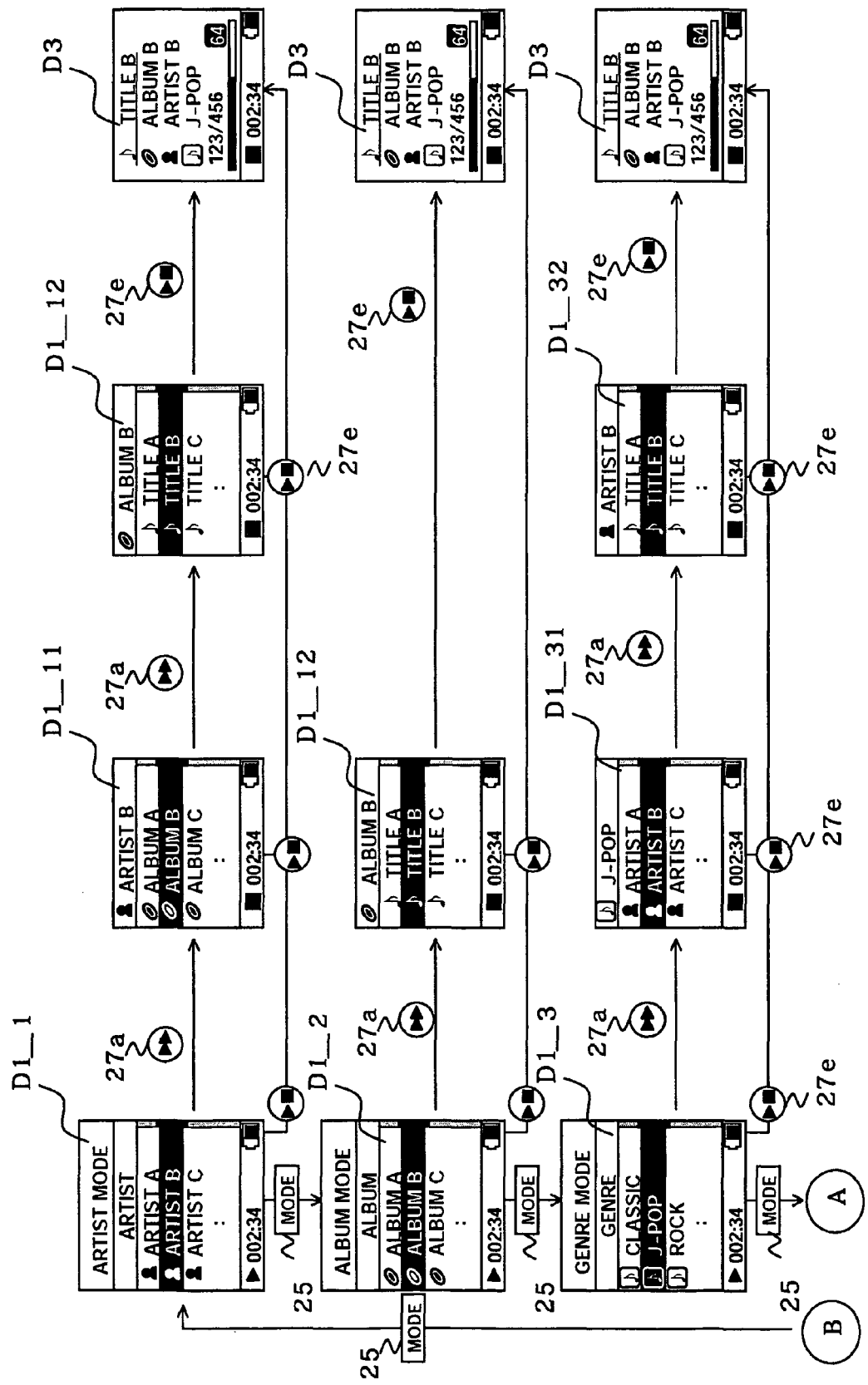
FIG. 6 is a view for illustrating a transition of a music selection screen displayed on the LCD panel shown in FIG. 1.
Figure 7:
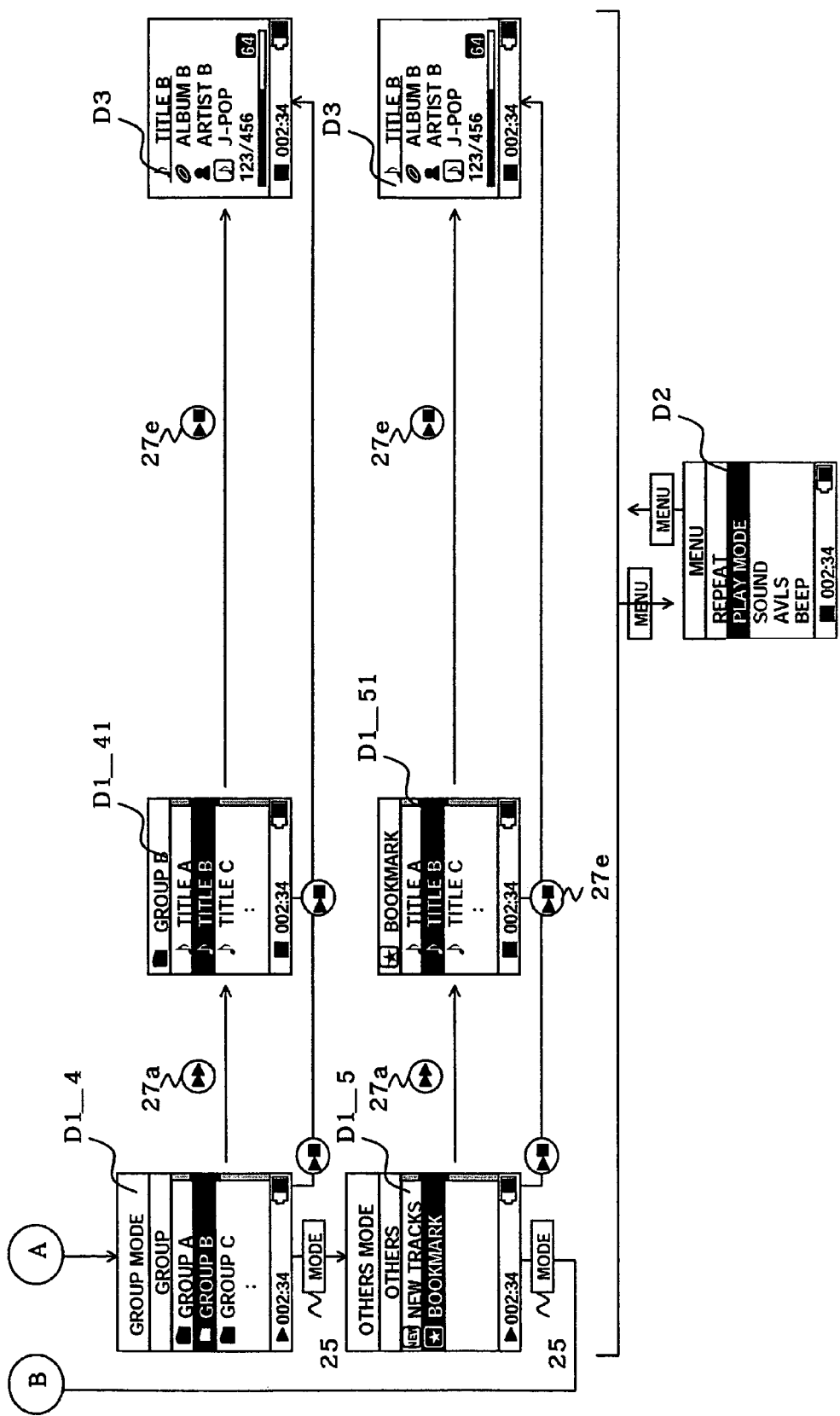
FIG. 7 is a view for illustrating the transition of the music selection screen displayed on the LCD panel shown in FIG. 1.

The first level music selection screens D1 for example include the music selection screens D1_1, D1_2, D1_3, D1_4, and D1_5 shown in FIGS. 6 and 7.

Here, the music selection screens D1_1, D1_2, D1_3, D1_4, and D1_5 are screens for displaying the music data classified by artist, album, genre, group, or other attributes of the music data.

For example, when the user presses the MODE key 25 shown in FIG. 2A for a short time during display of the setting screen D2 on the LCD panel 14, the CPU 17 shown in FIG. 1 displays the music selection screen D1_1 shown in FIG. 6 on the LCD panel 14 based on the operation signal from the MODE key 25.

The music selection screen D1_1 displays a plurality of items classifying the music data using the artists as attributes, for example, the artists A, B, C, etc.

At that time, the CPU 17 may also display a first level music selection screen other than the music selection screen D1_1 on the LCD panel 14.

Next, when the user presses the MODE key 25 for a short time, the CPU 17 displays the music selection screen D1_2 shown in FIG. 6 on the LCD panel 14 based on the operation signal from the MODE key 25.

The music selection screen D1_2 displays a plurality of items classifying the music data using the albums as attributes, for example, the albums A, B, C, etc.

Next, when the user presses the MODE key 25 for a short time, the CPU 17 displays the music selection screen D1_3 shown in FIG. 6 on the LCD panel 14 based on the operation signal from the MODE key 25.

The music selection screen D1_3 displays a plurality of items classifying the music data using the genres as attributes, for example, "Classic", "J-pop", "Rock", etc.

Next, when the user presses the MODE key 25 for a short time, the CPU 17 displays the music selection screen D1_4 shown in FIG. 7 on the LCD panel 14 based on the operation signal from the MODE key 25.

The music selection screen D1_4 displays a plurality of items classifying the music data using groups defined by the personal computer 3 as attributes, for example, the groups A, B, C, etc.

Next, when the user presses the MODE key 25 for a short time, the CPU 17 displays the music selection screen D1_5 shown in FIG. 7 on the LCD panel 14 based on the operation signal from the MODE key 25.

The music selection screen D1_5 displays a plurality of items classifying the music data using other attributes, for example, "New Tracks" indicating tracks (music data) newly input from the personal computer 3 and "bookmarks" indicating that bookmarks have been attached by the users as attributes.

Next, when the user presses the MODE key 25 for a short time, the CPU 17 displays the music selection screen D1_1 shown in FIG. 6 on the LCD panel 14 based on the operation signal from the MODE key 25.

Next, the case of shifting from the first level music selection screens D1_1 to D1_5 to the second and third level music selection screens and the reproduction screen D3 shown in FIG. 6 and FIG. 7 will be explained.

When the CPU 17 detects that the right direction key 27a shown in FIG. 2B was pressed for a short time during display of the music selection screen, the CPU 17 displays the music selection screen of items lower than the selected item on the displayed music selection screen on the LCD panel 14.

When the CPU 17 detects that the left direction key 27b shown in FIG. 2B was pressed for a short time during display of the music selection screen, the CPU 17 displays the music selection screen of items higher than the displayed music selection screen on the LCD panel 14.

When the LCD panel 14 displays the music selection screen D1_1 shown in FIG. 6, if the user operates the up direction key 27c and the down direction key 27d (short pressing action) to make the cursor move upward and downward on the screen to position it on the item to be selected (artist name), then presses the right direction key 27a for a short time to select the item, the CPU 17 displays the second level music selection screen D1_11 on the LCD panel 14 based on the operation signal from the key.

The second level music selection screen D1_11 displays the items belonging to the selected item, namely, the items below the selected item.

Namely, the music selection screen D1_11 displays the items of the albums A, B, and C belonging to the selected item, that is, the artist B.

Further, when the LCD panel 14 displays the second level music selection screen D1_11 shown in FIG. 6, if the user operates the up direction key 27c and the down direction key 27d (short pressing action) to make the cursor move upward and downward on the screen to position the cursor on the item to be selected (album name), then presses the right direction key 27a for a short time to select the item, the CPU 17 displays the third level music selection screen D1_12 on the LCD panel 14 based on the operation signal from the key.

The third level music selection screen D1_12 displays the items belonging to the selected item, namely the items below the selected item.

Namely, the music selection screen D1_12 displays the items of the titles A, B, and C belonging to the selected item, namely the album B. Note that the "title" indicates the track name.

Furthermore, when the LCD panel 14 displays the third level music selection screen D1_12 shown in FIG. 6, if the user operates the up direction key 27c and the down direction key 27d (short pressing action) to make the cursor move in upward and downward on the screen to position the cursor on the item to be selected (title name), then presses the execute key 27e for a short time to select the item, the CPU 17 displays the reproduction screen D3 for that title on the LCD panel 14 based on the operation signal from the key and reproduces the music data of that title.

When the LCD panel 14 displays the first level music selection screen D1_2 shown in FIG. 6, if the user operates the up direction key 27c and the down direction key 27d (short pressing action) to make the cursor move upward and downward on the screen to position the cursor on the item to be selected (title name), then presses the right direction key 27a for a short time to select the item, the CPU 17 displays the music selection screen D1_12 on the LCD panel 14 based on the operation signal from the key.

The music selection screen D_12 is then shifted to the reproduction screen D3 in the same way as explained above.

When the LCD panel 14 displays the first level music selection screen D1_3 shown in FIG. 6, if the user operates the up direction key 27c and the down direction key 27d (short pressing action) to make the cursor move upward and downward on the screen to position the cursor on the item to be selected (genre name), then presses the right direction key 27a for a short time to select the item, the CPU 17 displays the second level music selection screen D1_31 on the LCD panel 14 based on the operation signal from the key.

The second level music selection screen D1_31 displays the items belonging to the selected item, namely, the items lower than the selected item.

Namely, the second level music selection screen D1_31 displays the items of the artists A, B, and C belonging to the selected item, that is, the genre (J-pop).

Further, when the LCD panel 14 displays the second level music selection screen D1_31 shown in FIG. 6, if the user operates the up direction key 27c and the down direction key 27d (short pressing action) to make the cursor move upward and downward on the screen to position the cursor place on the item to be selected (artist name), then presses the right direction key 27a for a short time to select the item, the CPU 17 displays the third level music selection screen D1_32 on the LCD panel 14 based on the operation signal from the key.

The third level music selection screen D1_32 displays the items belonging to the selected item, namely the items lower than the selected item.

Namely, the music selection screen D1_32 displays the items of the titles A, B, and C belonging to the selected item, that is, the artist B.

Furthermore, when the LCD panel 14 displays the third level music selection screen D1_32 shown in FIG. 6, if the user operates the up direction key 27c and the down direction key 27d (short pressing action) to make the cursor move upward and downward on the screen to position the cursor on the item to be selected (title name), then presses the execute key 27e for a short time to select the item, the CPU 17 displays the reproduction screen D3 for that title on the LCD panel 14 based on the operation signal from the key and reproduces the music data of that title.

When the LCD panel 14 displays the first level music selection screen D1_4 shown in FIG. 7, if the user operates the up direction key 27c and the down direction key 27d (short pressing action) to make the cursor move upward and downward on the screen to position the cursor on the item to be selected (genre name), then presses the execute key 27e for a short time to select the item, the CPU 17 displays the second level music selection screen D1_41 on the LCD panel 14 based on the operation signal from the key.

The second level music selection screen D1_41 displays the items belonging to the selected item, namely the items lower than the selected item.

Namely, the second level music selection screen D1_41 displays the items of the titles A, B, and C belonging to the selected item, that is, the group B.

Furthermore, when the LCD panel 14 displays the second level music selection screen D1_41 shown in FIG. 7, if the user operates the up direction key 27c and the down direction key 27d (short pressing action) to make the cursor move upward and downward on the screen to position the cursor on the item to be selected (title name), then presses the execute key 27e for a short time to select the item, the CPU 17 displays the reproduction screen D3 for the title on the LCD panel 14 based on the operation signal from the key and plays the music data of that title.

When the LCD panel 14 displays the first level music selection screen D1_5 shown in FIG. 7, if the user operates the up direction key 27c and the down direction key 27d (short pressing action) to make the cursor move upward and downward on the screen to position the cursor on the item to be selected (new track or bookmark), then presses the right direction key 27a for a short time to select the item, the CPU 17 displays the second level music selection screen D1_51 on the LCD panel 14 based on the operation signal from the key.

The second level music selection screen D1_51 displays the title names belonging to the selected item, namely the items lower than the selected item.

Namely, in the example shown in FIG. 7, the second level music selection screen D1_41 displays the titles A, B, and C belonging to the selected item, that is, the bookmark.

Furthermore, when the LCD panel 14 displays the second level music selection screen D1_51 shown in FIG. 7, if the user operates the up direction key 27c and the down direction key 27d (short pressing action) to make the cursor move upward and downward on the screen to position the cursor on the item to be selected (title name), then presses the execute key 27e for a short time to select the item, the CPU 17 displays the reproduction screen D3 for the title on the LCD panel 14 based on the operation signal from the key and reproduces the music data of that title.

Figure 8:
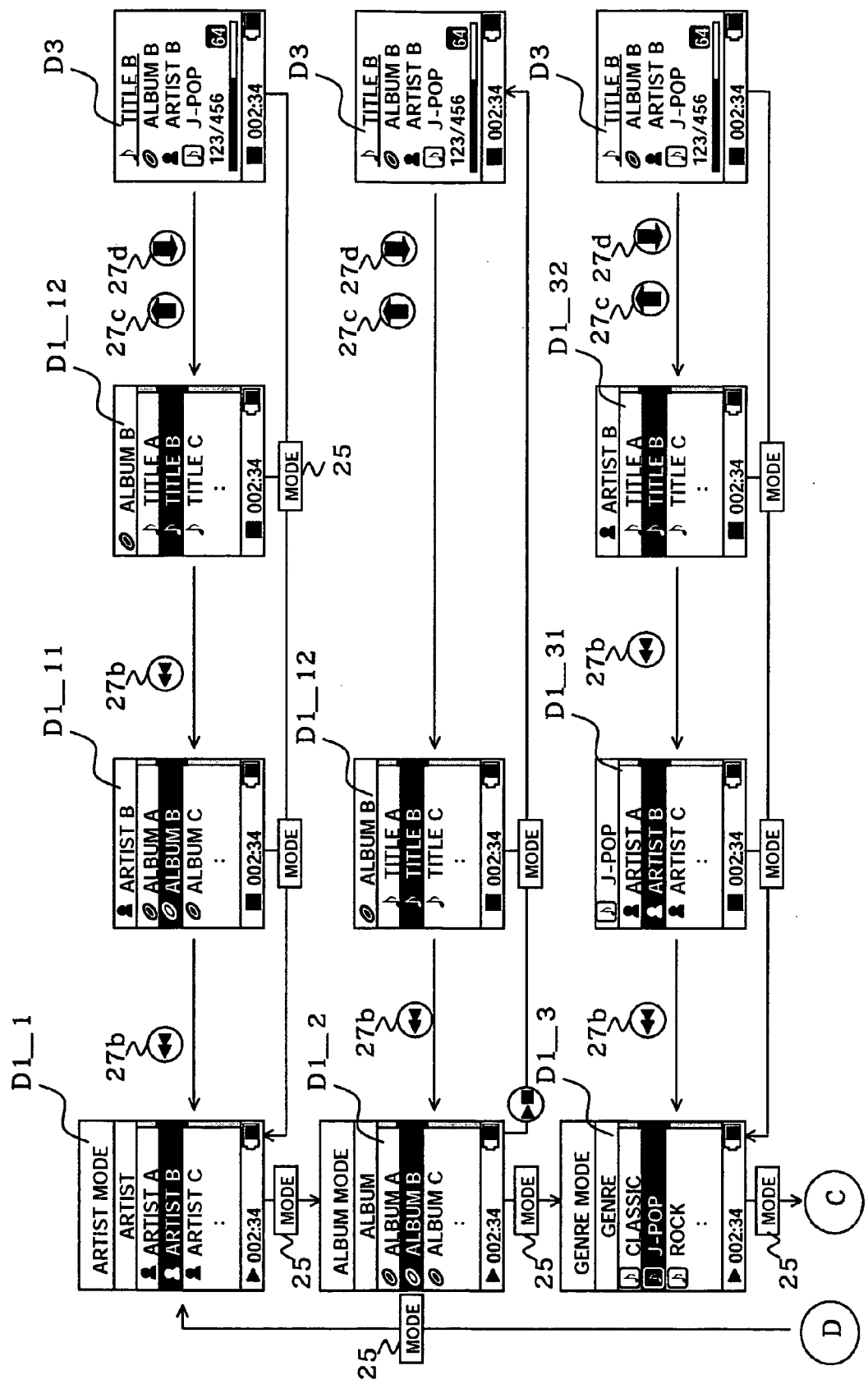
FIG. 8 is a view for illustrating the transition of the music selection screen displayed on the LCD panel shown in FIG. 1.
Figure 9:
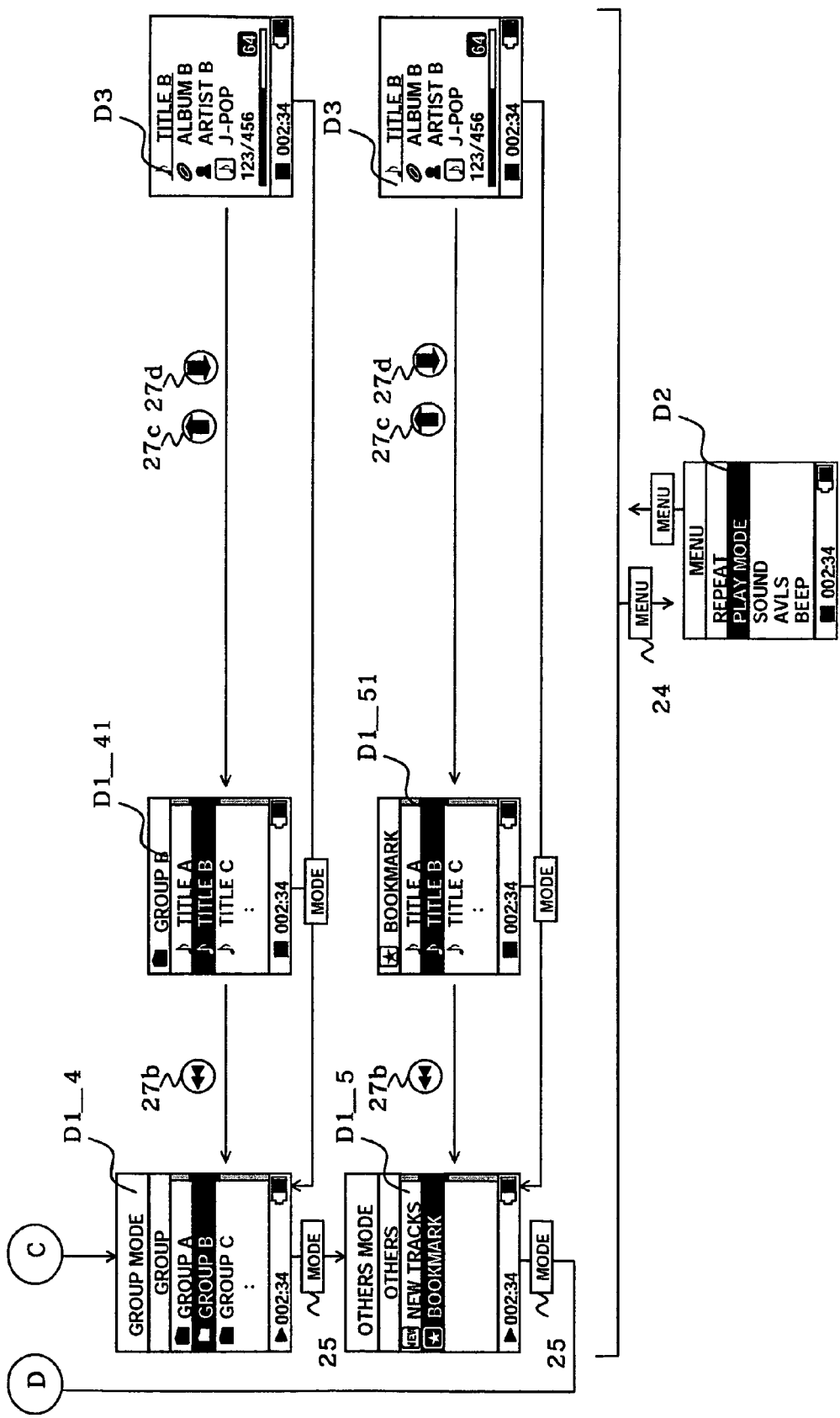
FIG. 9 is a view for illustrating the transition of the music selection screen displayed on the LCD panel shown in FIG. 1.

As shown in FIG. 8 and FIG. 9, when the MODE key 25 is pressed for a short time during display of the second and the third level music selection screens D1_11, D1_12, D1_31, D1_32, D1_41, and D1_51 or the reproduction screen D3 on the LCD panel 14, the CPU 17 displays the first level music selection screen corresponding to the displayed music selection screen on the LCD panel 14.

When the left direction key 27b is pressed for a short time during display of the second and the third level music selection screens D1_11, D1_12, D1_31, D1_32, D1_41, and D1_51 on the LCD panel 14, the CPU 17 displays the one higher level music selection screen of the displayed music selection screen on the LCD panel 14.

Further, when the up direction key 27c or the down direction key 27d is pressed for a short time during display of the reproduction screen D3 on the LCD panel 14, the CPU 17 shifts to the immediately preceding music selection screen D1 and moves the cursor position upward or downward.

FIG. 10 shows the transition of the level mentioned above.

Next, the selection of the play mode will be explained.

If the user presses the MENU key 24 shown in FIG. 2A for a short time, the CPU 17 displays the setting screen D2 shown in FIG. 4B on the LCD panel 14 based on the operation signal.

Then, as shown in FIG. 4, the user operates the up direction key 27c and the down direction key 27d (short pressing action) to make the cursor move in the upward and downward directions on the setting screen D2 to position the cursor on the "Play Mode", then presses the execute key 27e for a short time.

Figure 11:
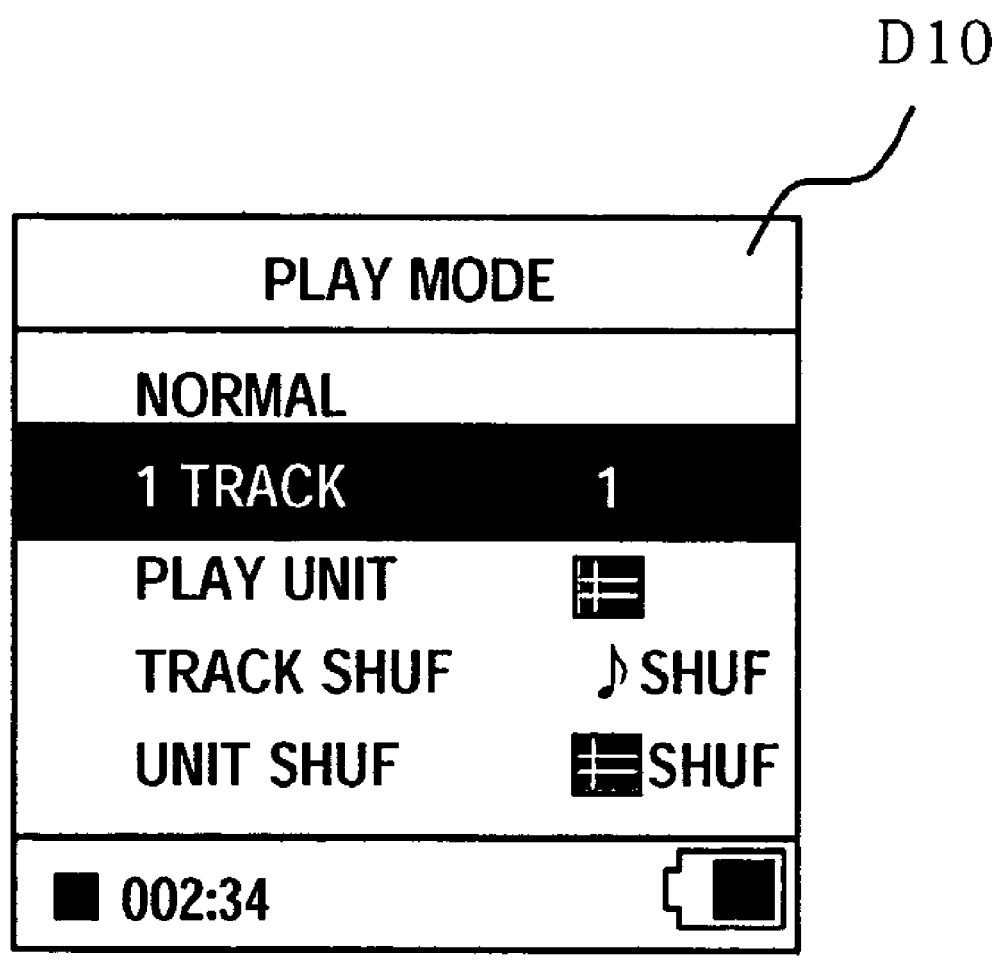
FIG. 11 is a view for illustrating a selection screen of a play mode displayed on the LCD panel shown in FIG. 1.

The CPU 17 detects the short pressing action of the execute key 27e based on the operation signal and displays the play mode selection screen D10 on the LCD panel 14 as shown in FIG. 11.

The play mode selection screen D10 displays normal play ("Normal"), one-track play ("1 track"), unit play ("Play Unit"), track shuffle ("Track SHUF"), and unit shuffle ("Unit SHUF") as items of the play mode.

The user operates the up direction key 27c and the down direction key 27d (short pressing action) to make the cursor move upward and downward on the play mode selection screen D10 to position the cursor on the item of the play mode to be selected, then presses the execute key 27e.

As a result, the CPU 17 selects the play mode at which the cursor is positioned.

The CPU 17 selects and reproduces the music data stored in the HDD 13 in a predetermined order of reproduction based on the items displayed on the music selection screen D1 and the selected play mode when the execute key 27e is pressed for a short time during display of the music selection screen D1.

At that time, the CPU 17 reads out the selected music data from the HDD 13 shown in FIG. 1, decodes it, and outputs it to the audio output circuit 18. The audio output circuit 18 outputs an audio signal in accordance with the audio data to the headphone terminal 21.

Next, reproduction processing will be explained based on the play modes explained above.

Note that, in the present embodiment, the plurality of items displayed on the music selection screen is handled as a "play unit". A play unit is determined by the music selection screen for which reproduction is started.

The play unit may also belong to the item the cursor is positioned at on the music selection screen.

Further, the play unit may be used for managing the content data based on the tree structure in the related art.

(Normal Play ("Normal"))

When the CPU 17 detects that the normal play has been selected as the play mode and the execute key 27e has been pressed for a short time during the display of the selection screen D1 on the LCD panel 14, the CPU 17 performs the normal play operation for reproducing the tracks for playback one by one in order of the track numbers.

The CPU 17 successively reproduces the items below the item selected on the music selection screen D1 (selected by the cursor), finishes reproducing the bottommost item, then stops the playback.

If the selected item is a group (artist, album, etc.), the CPU 17 successively reproduces the tracks in the group belonging to each item, then, after finishing reproducing all of the tracks in the group, successively reproduces the tracks of the next group.

Further, the CPU 17 performs the following processing when another play mode is switched to during normal play.

When one-track play is switched to, the CPU 17 finishes reproducing the track in progress, then ends playback.

When unit play is switched to, the CPU 17 treats all of the tracks in the item including the track in progress as a unit and reproduces all of the tracks in the unit to the last.

When track shuffle play is switched to, the CPU 17 shuffles all of the tracks.

When unit shuffle play is switched to, the CPU 17 shuffles all of the tracks in the unit including the track in progress.

Further, when the execute key 27e is pressed for a short time during display of the music selection screen D1_1 shown in FIG. 6, the CPU 17 reproduces the tracks from the first track of the first album of the artist at which the cursor is positioned in order of the tracks, then ends the playback when finishing reproducing the last track of the last artist.

When the execute key 27e is pressed for a short time during display of the music selection screen D1_11 shown in FIG. 6, the CPU 17 reproduces the tracks from the first track of the first album at which the cursor is positioned in the order of tracks and ends the playback when finishing reproducing the last track of the last album.

When the execute key 27e is pressed for a short time during display of the music selection screen D1_12 shown in FIG. 6, the CPU 17 reproduces the tracks from the track of the cursor position in the order of the tracks and ends the playback when finishing reproducing the last track.

When the execute key 27e is pressed for a short time during display of the music selection screen D1_2 shown in FIG. 6, the CPU 17 reproduces the tracks from the first track of the album at which the cursor is positioned from in the order of the tracks and ends the playback when finishing reproducing the last track of the last album.

When the execute key 27e is pressed for a short time during display of the music selection screen D1_21 shown in FIG. 6, the CPU 17 reproduces the tracks from the track at which the cursor is positioned in the order of the tracks and ends the playback when finishing reproducing the last track.

Further, when the execute key 27e is pressed for a short time during display of the music selection screen D1_3 shown in FIG. 6, the CPU 17 reproduces the tracks from the first track of a first artist of the genre at which the cursor is positioned in the order of the tracks and ends the playback when finishing reproducing the last track of the last genre.

When the execute key 27e is pressed for a short time during display of the music selection screen D1_31 shown in FIG. 6, the CPU 17 reproduces the tracks from the first track of a first artist at which the cursor is positioned in the order of the tracks and ends the playback when finishing reproducing the last track of the last artist.

When the execute key 27e is pressed for a short time during display of the music selection screen D1_32 shown in FIG. 6, the CPU 17 reproduces the tracks from the track at which the cursor is positioned in the order of the tracks and ends the playback when finishing reproducing the last track.

When the execute key 27e is pressed for a short time during display of the music selection screen D1_4 shown in FIG. 7, the CPU 17 reproduces the tracks from the first track of a group at which the cursor is positioned in the order of the tracks and ends the playback when finishing reproducing the last track of the last group.

When the execute key 27e is pressed for a short time during display of the music selection screen D1_41 shown in FIG. 6, the CPU 17 reproduces the tracks from the track at which the cursor is positioned in the order of the tracks and ends the playback when finishing reproducing the last track.

When the execute key 27*e* is pressed for a short time during display of the music selection screen D1_5 shown in FIG. 7, the CPU 17 reproduces the tracks from the first track of a play list at which the cursor is positioned in the order of the tracks and ends the playback when finishing reproducing the last track of the last play list.

When the execute key 27*e* is pressed for a short time during display of the music selection screen D1_51 shown in FIG. 7, the CPU 17 reproduces the tracks from the track at which the cursor is positioned in the order of the tracks and ends the playback when finishing reproducing the last track.

When the execute key 27*e* is pressed for a short time during display of the music selection screen D1_5 shown in FIG. 7, the CPU 17 reproduces the tracks from the first track of the bookmark at which the cursor is positioned in the order of the tracks and ends the playback when finishing reproducing the last track of the last bookmark.

When the execute key 27*e* is pressed for a short time during display of the music selection screen D1_5 shown in FIG. 7, the CPU 17 reproduces the tracks from the track at which the cursor is positioned in the order of the tracks and ends the playback when finishing reproducing the last track.

(One-Track Play ("1 Track"))

When the CPU 17 detects that one track play has been selected as the play mode and the execute key 27*e* is pressed for a short time during display of the selection screen D1 on the LCD panel 14, the CPU 17 reproduces the track at which the cursor is positioned one time.

The CPU 17 reproduces the selected item and ends the playback when finishing reproducing the tracks.

If the selected item is a group (artist, album, etc.), the CPU 17 reproduces the first track in the group belonging to the item.

The CPU 17 performs the following processing when another play mode is switched to during track reproduction.

When normal play is switched to, the CPU 17 successively reproduces the items lower than the track in progress and ends the playback when finishing reproducing the bottommost item.

When unit play is switched to, the CPU 17 treats a group of tracks including the track in progress as a unit and plays all of the tracks of the unit to the end.

When track shuffle play is switched to, the CPU 17 shuffles and reproduces all of the tracks.

When unit shuffle play is switched to, the CPU 17 shuffles and reproduces all of the tracks in the unit including the track in progress.

When the execute key 27*e* is pressed for a short time during display of the music selection screen D1_1 shown in FIG. 6, the CPU 17 reproduces the first track of the first album of the artist at which the cursor is positioned.

When the execute key 27*e* is pressed for a short time during display of the music selection screen D1_11 shown in FIG. 6, the CPU 17 reproduces the first track of the album at which the cursor is positioned.

When the execute key 27*e* is pressed for a short time during display of the music selection screen D1_12 shown in FIG. 6, the CPU 17 reproduces the track at which the cursor is positioned.

When the execute key 27*e* is pressed for a short time during display of the music selection screen D1_2 shown in FIG. 6, the CPU 17 reproduces the first track of the album at which the cursor is positioned.

When the execute key 27*e* is pressed for a short time during display of the music selection screen D1_21 shown in FIG. 6, the CPU 17 reproduces the track at which the cursor is positioned.

Further, when the execute key 27*e* is pressed for a short time during display of the music selection screen D1_3 shown in FIG. 6, the CPU 17 reproduces the first track of the first artist of the genre at which the cursor is positioned.

When the execute key 27*e* is pressed for a short time during display of the music selection screen D1_31 shown in FIG. 6, the CPU 17 reproduces the first track of the artist at which the cursor is positioned.

When the execute key 27*e* is pressed for a short time during display of the music selection screen D1_32 shown in FIG. 6, the CPU 17 reproduces the track at which the cursor is positioned.

When the execute key 27*e* is pressed for a short time during display of the music selection screen D1_4 shown in FIG. 7, the CPU 17 reproduces the first track of the group at which the cursor is positioned.

When the execute key 27*e* is pressed for a short time during display of the music selection screen D1_41 shown in FIG. 6, the CPU 17 reproduces the track at which the cursor is positioned.

When the execute key 27*e* is pressed for a short time during display of the music selection screen D1_5 shown in FIG. 7, the CPU 17 reproduces the first track of the play list at which the cursor is positioned.

When the execute key 27*e* is pressed for a short time during display of the music selection screen D1_51 shown in FIG. 7, the CPU 17 reproduces the track at which the cursor is positioned.

When the execute key 27*e* is pressed for a short time during display of the music selection screen D1_5 shown in FIG. 7, the CPU 17 reproduces the first track of the bookmark at which the cursor is positioned.

When the execute key 27*e* is pressed for a short time during display of the music selection screen D1_5 shown in FIG. 7, the CPU 17 reproduces the track at which the cursor is positioned.

(Unit Play ("Play Unit"))

When the CPU 17 detects that the unit play mode has been selected as the play mode and the execute key 27*e* is pressed for a short time during display of the selection screen D1 on the LCD panel 14, the CPU 17 reproduces the tracks in a unit.

The CPU 17 treats all of the items of the level at which the cursor is positioned in the music selection screen D1 as a play range (unit), starts the reproduction from the item at which the cursor is positioned, finishes the reproduction of the play unit, then ends the playback.

When the reproduction is started from a middle item of the unit, the CPU 17 reproduces the lead item of the unit after reproducing the last item.

If the selected item is a group (artist, album, etc.), the CPU 17 reproduces the tracks from the first track in the group belonging to the item.

The CPU 17 performs the following processing when another play mode is switched to during unit play.

When normal play is switched to, the CPU 17 successively reproduces the items lower than the track in progress and ends the playback when finishing reproducing the bottommost item.

When one-track play is switched to, the CPU 17 ends the playback when finishing reproducing the track in progress.

When track shuffle play is switched to, the CPU 17 shuffles all of the tracks in the unit.

When unit shuffle play is switched to, the CPU 17 shuffles all of the items in the unit including the track in progress.

When the execute key 27e is pressed for a short time during display of the music selection screen D1_1 shown in FIG. 6, the CPU 17 successively reproduces all of the tracks belonging to all of the artists from the cursor position.

When the execute key 27e is pressed for a short time during display of the music selection screen D1_11 shown in FIG. 6, the CPU 17 successively reproduces all of the tracks belonging to all of the albums of the artist selected on the music selection screen D1_1 from the cursor position.

When the execute key 27e is pressed for a short time during display of the music selection screen D1_12 shown in FIG. 6, the CPU 17 successively reproduces all of the tracks of the album selected on the music selection screen D1_11 from the cursor position.

When the execute key 27e is pressed for a short time during display of the music selection screen D1_2 shown in FIG. 6, the CPU 17 successively reproduces all of the tracks belonging to all of the albums from the cursor position.

When the execute key 27e is pressed for a short time during display of the music selection screen D1_21 shown in FIG. 6, the CPU 17 successively reproduces all of the tracks of the album selected on the music selection screen D1_2 from the cursor position.

When the execute key 27e is pressed for a short time during display of the music selection screen D1_3 shown in FIG. 6, the CPU 17 successively reproduces all of the tracks belonging to all of the genres from the cursor position.

When the execute key 27e is pressed for a short time during display of the music selection screen D1_31 shown in FIG. 6, the CPU 17 successively reproduces all of the tracks belonging to all of the artists of the genre selected on the music selection screen D1_3 from the cursor position.

When the execute key 27e is pressed for a short time during display of the music selection screen D1_32 shown in FIG. 6, the CPU 17 successively reproduces all of the tracks of the artist selected on the music selection screen D1_31 from the cursor position.

When the execute key 27e is pressed for a short time during display of the music selection screen D1_4 shown in FIG. 7, the CPU 17 successively reproduces all of the tracks belonging to all of the groups.

When the execute key 27e is pressed for a short time during display of the music selection screen D1_41 shown in FIG. 6, the CPU 17 successively reproduces all of the tracks of the group selected on the music selection screen D1_4 from the cursor position.

When the execute key 27e is pressed for a short time during display of the music selection screen D1_5 shown in FIG. 7, the CPU 17 successively reproduces all of the tracks belonging to all of the play lists.

When the execute key 27e is pressed for a short time during display of the music selection screen D1_51 shown in FIG. 7, the CPU 17 successively reproduces all of the tracks of the play list selected on the music selection screen D1_5 from the cursor position.

When the execute key 27e is pressed for a short time during display of the music selection screen D1_5 shown in FIG. 7, the CPU 17 successively reproduces all of the tracks belonging to all of the bookmarks.

When the execute key 27e is pressed for a short time during display of the music selection screen D1_5 shown in FIG. 7, the CPU 17 successively reproduces all of the tracks of the bookmark selected on the music selection screen D1_5 from the cursor position.

(Track Shuffle Play ("Track SHUF"))

When the CPU 17 detects that the track shuffle mode has been selected as the play mode and the execute key 27e is pressed for a short time during display of the selection screen D1 on the LCD panel 14, the CPU 17 reproduces the tracks for playback randomly one at a time.

The CPU 17 shuffles the order of reproduction in the shuffle each time to make the order of reproduction different from a last time. Note that if only a few tracks are to be reproduced, the order of reproduction may also be made the same as the last time.

The CPU 17 ensures that the head track in the next shuffle does not become the same as the last track of the previous time in the case of starting reproduction after ending reproduction in shuffle and the case of repeat shuffle. Note that if only a few tracks are to be reproduced, the head track may also be made the same the last track of the previous time.

The CPU 17 makes the track in progress the head track to be reproduced and makes the n-th (n is the number of the track to be played) track the last track when switching to shuffle during playback.

The CPU 17 performs the following processing when another play mode is switched to during track shuffle.

When normal play is switched to, the CPU 17 successively reproduces the items lower than the track in progress and ends the playback when finishing reproducing the bottommost item.

When one-track play is switched to, the CPU 17 ends the playback after finishing reproducing the track.

When unit play is switched to, the CPU 17 treats the group of tracks including the track in progress as a unit and successively reproduces all of the items in the unit.

When unit shuffle play is switched to, the CPU 17 shuffles and reproduces all of the tracks in the unit.

When the execute key 27e is pressed for a short time during display of the music selection screen D1_1 shown in FIG. 6, the CPU 17 shuffles and reproduces all of the tracks belonging to all of the artists.

When the execute key 27e is pressed for a short time during display of the music selection screen D1_11 shown in FIG. 6, the CPU 17 shuffles and reproduces all of the tracks belonging to all of the albums of the artist selected on the music selection screen D1_1.

When the execute key 27e is pressed for a short time during display of the music selection screen D1_12 shown in FIG. 6, the CPU 17 shuffles and reproduces all of the tracks of the album selected on the music selection screen D1_11.

When the execute key 27e is pressed for a short time during display of the music selection screen D1_2 shown in FIG. 6, the CPU 17 shuffles and reproduces all of the tracks belonging to all of the albums.

When the execute key 27e is pressed for a short time during display of the music selection screen D1_21 shown in FIG. 6, the CPU 17 shuffles and reproduces all of the tracks of the album selected on the music selection screen D1_2.

When the execute key 27e is pressed for a short time during display of the music selection screen D1_3 shown in FIG. 6, the CPU 17 shuffles and reproduces all of the tracks belonging to all of the genres.

When the execute key 27e is pressed for a short time during display of the music selection screen D1_31 shown in FIG. 6, the CPU 17 shuffles and reproduces all of the tracks belonging to all of the artists of the genre selected on the music selection screen D1_3.

When the execute key 27e is pressed for a short time during display of the music selection screen D1_32 shown in FIG. 6, the CPU 17 shuffles and reproduces all of the tracks of the artist selected on the music selection screen D1_31.

When the execute key 27e is pressed for a short time during display of the music selection screen D1_4 shown in FIG. 7, the CPU 17 shuffles and reproduces all of the tracks belonging to all of the groups.

When the execute key 27e is pressed for a short time during display of the music selection screen D1_41 shown in FIG. 6, the CPU 17 shuffles and reproduces all of the tracks of the group selected on the music selection screen D1_4.

When the execute key 27e is pressed for a short time during display of the music selection screen D1_5 shown in FIG. 7, the CPU 17 shuffles and reproduces all of the tracks belonging to all of the play lists.

When the execute key 27e is pressed for a short time during display of the music selection screen D1_51 shown in FIG. 7, the CPU 17 shuffles and reproduces all of the tracks of the play list selected on the music selection screen D1_5.

When the execute key 27e is pressed for a short time during display of the music selection screen D1_5 shown in FIG. 7, the CPU 17 shuffles and reproduces all of the tracks belonging to all of the bookmarks.

When the execute key 27e is pressed for a short time during display of the music selection screen D1_5 shown in FIG. 7, the CPU 17 shuffles and reproduces all of the tracks of the bookmark selected on the music selection screen D1_5.

(Unit Shuffle Play ("Unit SHUF"))

When the CPU 17 detects that unit shuffle play has been selected as the play mode and the execute key 27e is pressed for a short time during display of the selection screen D1 on the LCD panel 14, the CPU 17 reproduces items in the unit randomly one at a time.

The CPU 17 treats all of the items of the level at which the cursor is positioned as the play range (unit) and shuffles all of the items in the unit.

The CPU 17 makes the order of reproduction in the group the same as that of normal play when the item in the unit is a group.

The CPU 17 shuffles the order of reproduction in the shuffle every time to prevent the order of reproduction from becoming the same as the previous time. Note that, if only a few items are to be reproduced, the order of reproduction may also be made the same as the last time.

The CPU 17 ensures that the head item in the next shuffle does not become the same as the last item of the previous time in the case of starting reproduction after ending reproduction in shuffle and the case of repeat shuffle. Note that if only a few items are to be reproduced, the head item may also be made the same the last item of the previous time.

The CPU 17 makes the item in progress the head item to be reproduced and makes the n-th (n is the number of the items to be reproduced) item as the last item when switching to the shuffle in playback.

The CPU 17 performs the following processing when another play mode is switched to in the unit shuffle.

When normal play is switched to, the CPU 17 successively reproduces the items lower than the track in progress and ends the playback when finishing reproducing the bottommost item.

When one-track play is switched to, the CPU 17 ends the playback when finishing reproducing the track in progress.

When unit play is switched to, the CPU 17 successively reproduces all of the tracks in the unit.

When track shuffle play is switched to, the CPU 17 shuffles and reproduces all of the items in the unit including the track in progress.

When the execute key 27e is pressed for a short time during display of the music selection screen D1_1 shown in FIG. 6, the CPU 17 successively reproduces all of the albums and tracks belonging to the artist and shuffles all of the artists.

When the execute key 27e is pressed for a short time during display of the music selection screen D1_11 shown in FIG. 6, the CPU 17 successively reproduces all of the tracks belonging to the album of the artist selected on the music selection screen D1_1 and shuffles the albums.

When the execute key 27e is pressed for a short time during display of the music selection screen D1_12 shown in FIG. 6, the CPU 17 shuffles and reproduces all of the tracks in the album selected on the music selection screen D1_11.

When the execute key 27e is pressed for a short time during display of the music selection screen D1_2 shown in FIG. 6, the CPU 17 reproduces all of the tracks in the album and shuffles the albums.

When the execute key 27e is pressed for a short time during display of the music selection screen D1_21 shown in FIG. 6, the CPU 17 shuffles and reproduces all of the tracks in the album selected on the music selection screen D1_2.

When the execute key 27e is pressed for a short time during display of the music selection screen D1_3 shown in FIG. 6, the CPU 17 successively reproduces all of the artists and tracks belonging to the genre and shuffles the genres.

When the execute key 27e is pressed for a short time during display of the music selection screen D1_31 shown in FIG. 6, the CPU 17 reproduces all of the tracks belonging to artists of the genre selected on the music selection screen D1_3 and shuffles the artists.

When the execute key 27e is pressed for a short time during display of the music selection screen D1_32 shown in FIG. 6, the CPU 17 shuffles and reproduces all of the tracks of the artist selected on the music selection screen D1_31.

When the execute key 27e is pressed for a short time during display of the music selection screen D1_4 shown in FIG. 7, the CPU 17 successively reproduces all of the tracks in the group and shuffles the groups.

When the execute key 27e is pressed for a short time during display of the music selection screen D1_41 shown in FIG. 6, the CPU 17 shuffles and reproduces all of the tracks of the group selected on the music selection screen D1_4.

When the execute key 27e is pressed for a short time during display of the music selection screen D1_5 shown in FIG. 7, the CPU 17 successively reproduces all of the tracks belonging to the play list and shuffles the play lists.

When the execute key 27e is pressed for a short time during display of the music selection screen D1_51 shown in FIG. 7, the CPU 17 shuffles and reproduces all of the tracks of the play list selected on the music selection screen D1_5.

When the execute key 27e is pressed for a short time during display of the music selection screen D1_5 shown in FIG. 7, the CPU 17 successively reproduces all of the tracks belonging to the bookmark and shuffles the bookmarks.

When the execute key 27e is pressed for a short time during display of the music selection screen D1_5 shown in FIG. 7, the CPU 17 shuffles and reproduces all of the tracks of the bookmark selected on the music selection screen D1_5.

Next, examples of the operation of the reproduction apparatus 1 shown in FIG. 1 will be explained.

First Operation Example

In this example of the operation, the case where the MODE key 25 shown in FIG. 2A is pressed for a short time will be explained.

Figure 12:
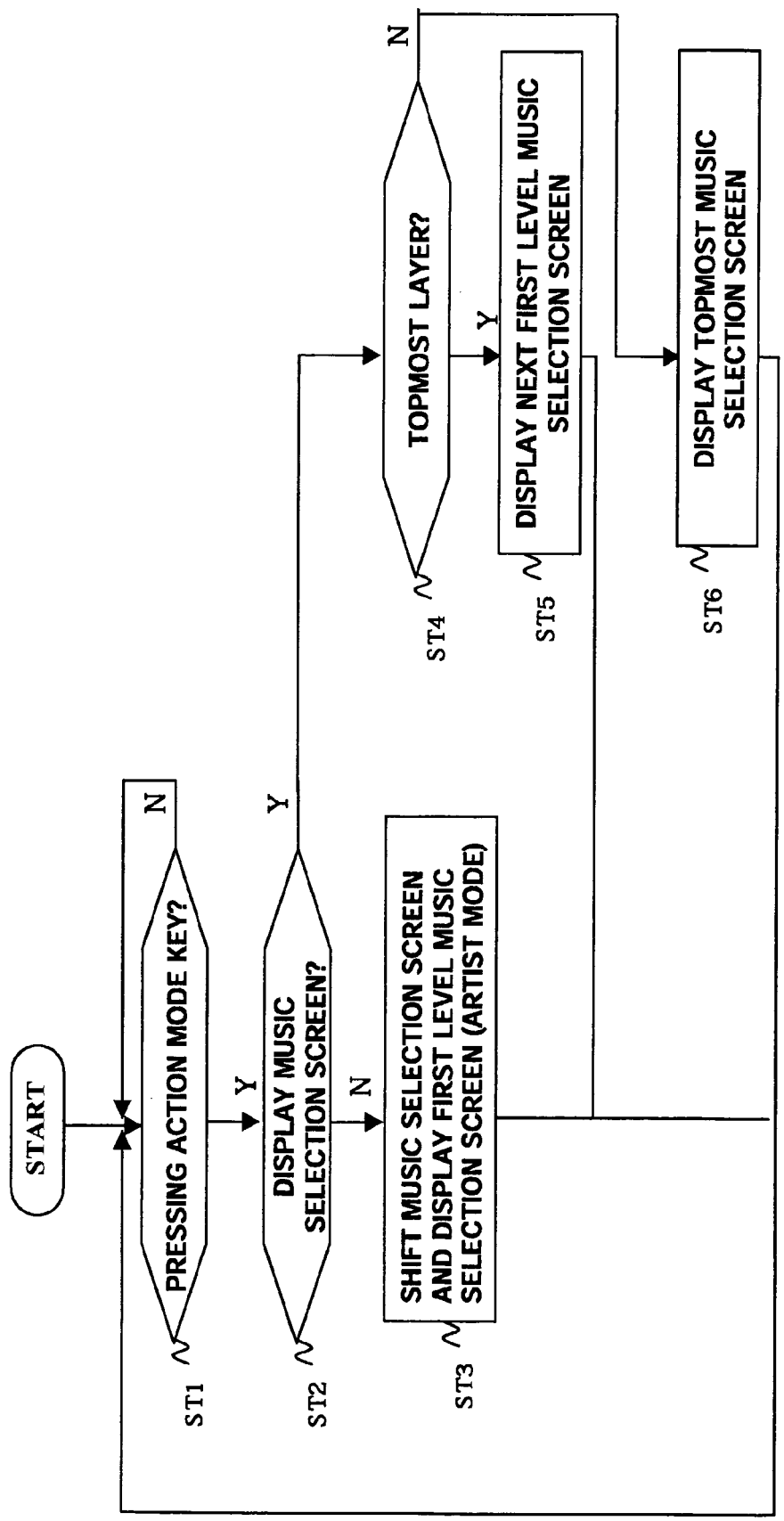
FIG. 12 is a flow chart for illustrating an example of the reproduction apparatus in which a MODE key shown in FIG. 2A is pressed for a short time.

FIG. 12 is a flow chart for illustrating the example of the operation.

Step ST1

When the CPU 17 decides that the MODE key 25 shown in FIG. 2A was pressed for a short time based on the operation signal from the input device 15 shown in FIG. 1, the routine proceeds to step ST2. When not, the routine repeats step ST1.

Step ST2

The CPU 17 decides whether or not the music selection screen D1 was displayed on the LCD panel 14 when the MODE key 25 was pressed for a short time at step ST1. When deciding that it was displayed, the routine proceeds to step ST4, while when not, the routine proceeds to step ST3.

Step ST3

The CPU 17 displays the music selection screen D1_1 shown in FIG. 6 on the LCD panel 14 as a default.

Step ST4

The CPU 17 decides whether or not the music selection screen D1 being displayed on the LCD panel 14 is one of the first level music selection screens D1_1, D1_2, D1_3, D1_4, and D1_5. When deciding that it is a first level music selection screen, the routine proceeds to step ST5, while when not, the routine proceeds to step ST6.

Step ST5

The CPU 17 displays the music selection screen D1 next in the order of display of the first level on the LCD panel 14. The order of display of the music selection screen D1 of the first level is successively the music selection screens D1_1, D1_2, D1_3, D1_4, and D1_5 as shown in FIGS. 6 and 7.

Step ST6

The CPU 17 displays the upper first level music selection screen D1 on the LCD panel 14 when the music selection screen D1 displayed on the LCD panel 14 is a second or third level music selection screen D1.

Second Operation Example

In this example of the operation, the case where the right or left directional key 27a or 27b shown in FIG. 2B is pressed for a long time when the music selection screen D1 is displayed on the LCD panel 14 will be explained.

Figure 13:
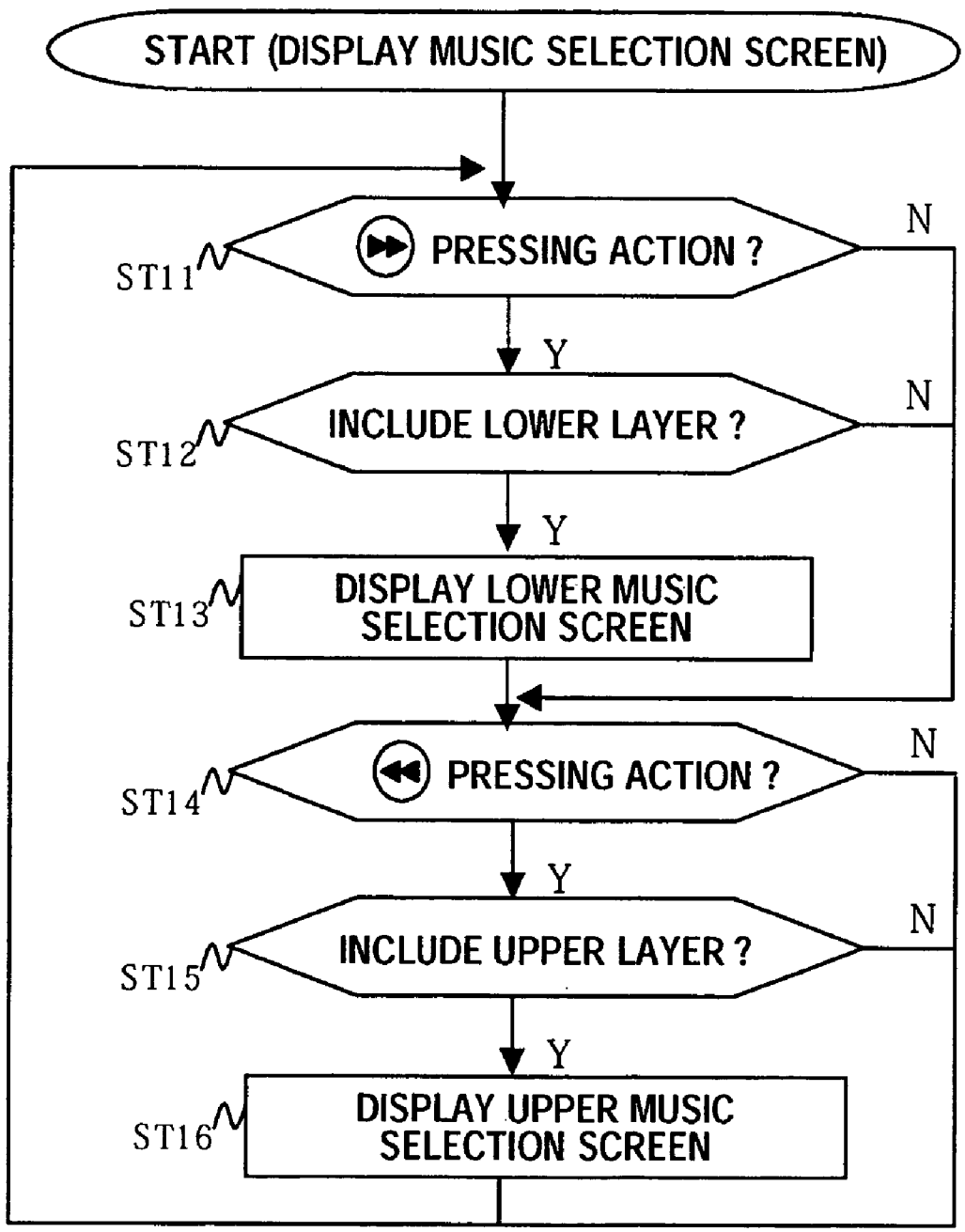
FIG. 13 is a flow chart for illustrating an example of the operation of the reproduction apparatus in which a right direction key or left direction key shown in FIG. 2B is pressed for a short time when a music selection screen D1 is displayed on the LCD panel.

FIG. 13 is a flow chart for illustrating this example of the operation.

Step ST11

When the CPU 17 decides that the right direction key 27a shown in FIG. 2B was pressed for a short time based on the operation signal from the input device 15 shown in FIG. 1, the routine proceeds to step ST12. When not, the routine proceeds to step ST14.

Step ST12

The CPU 17 decides whether or not there is a lower music selection screen D1 corresponding to the item at which the cursor is positioned in the displayed music selection screen D1. When deciding that there is, the routine proceeds to step ST13, while when not, the routine proceeds to step ST14.

Step ST13

The CPU 17 displays the lower music selection screen D1 corresponding to the item at which the cursor is positioned in the displayed music selection screen D1 on the LCD panel 14.

Step ST14

When the CPU 17 decides that the left direction key 27b shown in FIG. 2B was pressed for a short time based on the operation signal from the input device shown in FIG. 1, the routine proceeds to step ST15. When not, the routine returns to step ST11.

Step ST15

The CPU 17 decides whether or not there is an upper music selection screen D1 corresponding to the displayed music selection screen D1. When deciding that there is, the routine proceeds to step ST16, while when not, the routine returns to step ST11.

Step ST16

The CPU 17 displays the upper music selection screen D1 corresponding to the displayed music selection screen D1 on the LCD panel 14.

Third Operation Example

In this example of the operation, the case where the execute key 27e shown in FIG. 2B is pressed for a short time (a reproduction instruction is output) when the music selection screen D1 is displayed on the LCD panel 14 will be explained.

Figure 14:
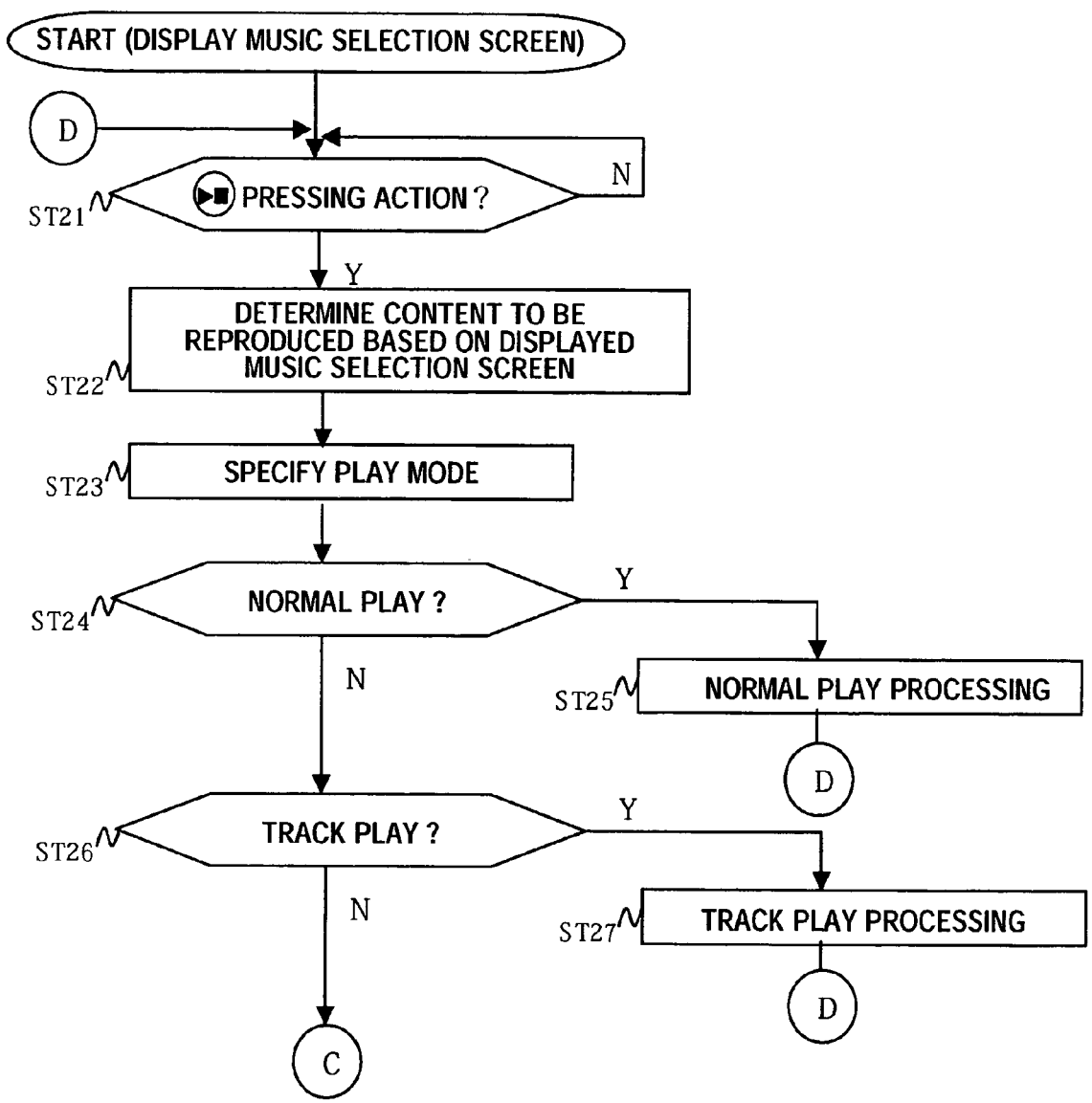
FIG. 14 is a flow chart for illustrating the case where an execute key shown in FIG. 2B is pressed for a short time, namely reproduction is instructed, when the music selection screen D1 is displayed on the LCD panel.
Figure 15:
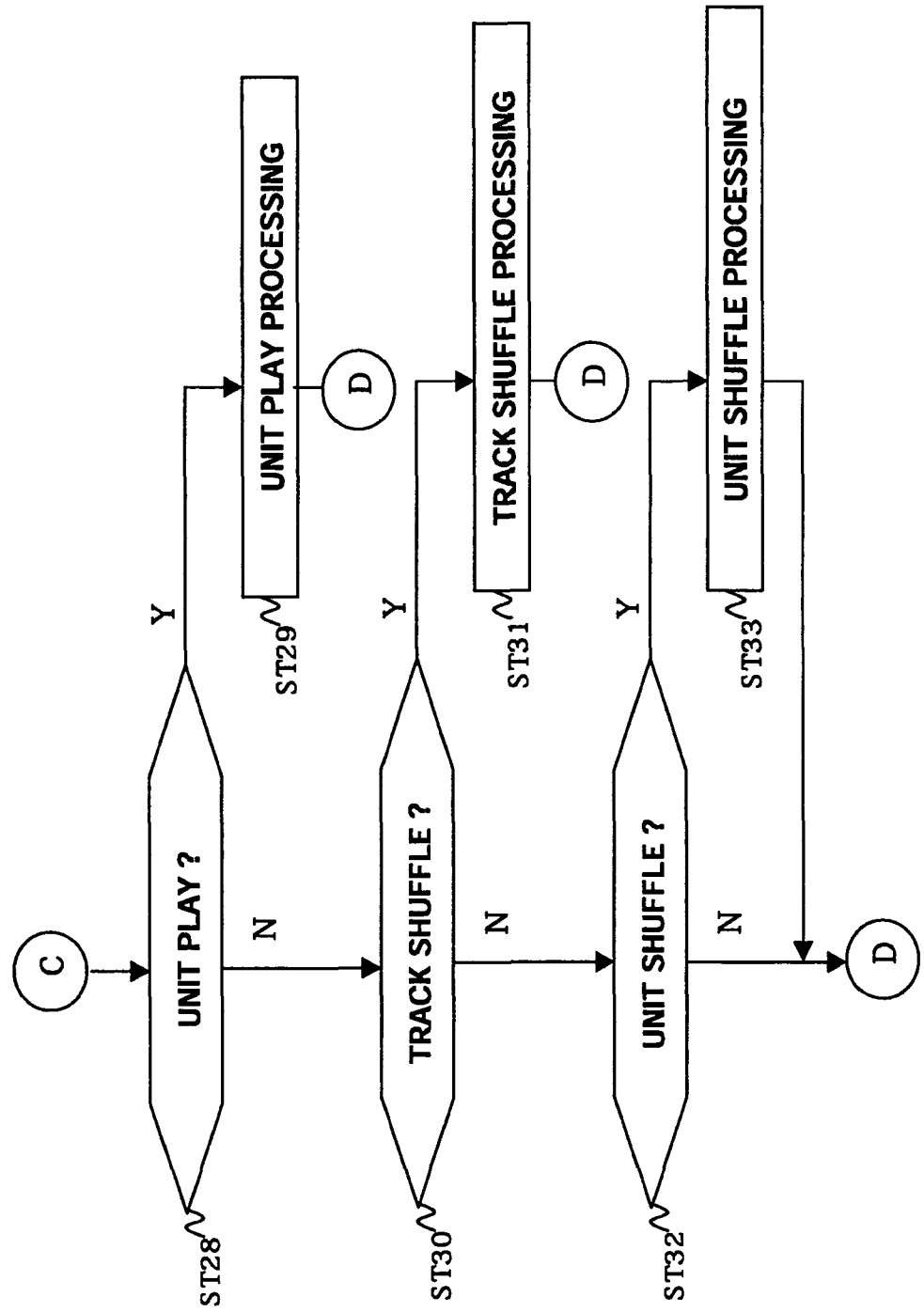
FIG. 15 is a continuation of the flow chart of FIG. 11 for illustrating the case where an execute key shown in FIG. 2B is pressed for a short time, namely reproduction is instructed, when the music selection screen D1 is displayed on the LCD panel.

FIGS. 14 and 15 are flow charts for illustrating the example of the operation.

Step ST21

When the CPU 17 decides that the execute key 27e shown in FIG. 2B was pressed for a short time based on the operation signal from the input device 15 shown in FIG. 1, the routine proceeds to step ST22. When not, the routine repeats step ST21.

Step ST22

The CPU 17 sets the content data belonging to the item displayed on the music selection screen D1 at that time as a candidate for playback when the execute key 27e is pressed for a short time during display of the music selection screen D1.

Step ST23

The CPU 17 specifies the play mode determined by using the play mode selection screen D10 shown in FIG. 11.

The CPU 17 selects and reproduces the music data stored on the HDD 13 in order of reproduction determined by the play mode based on the specified play mode in the following steps.

At that time, the CPU 17 reads out the selected music data from the HDD 13 shown in FIG. 1, decodes it, and outputs it to the audio output circuit 18.

The audio output circuit 18 outputs the audio signal corresponding to the audio data to the headphone terminal 21.

Step ST24

The CPU 17 decides whether or not the play mode specified at step ST23 is normal play. When deciding that it is normal play, the routine proceeds to step ST25, while when not, the routine proceeds to step ST26.

Step ST25

The CPU 17 performs the reproduction processing explained in the above "Normal Play" section.

Step ST26

The CPU 17 decides whether or not the play mode specified at step ST23 is track play. When deciding that it is track play, the routine proceeds to step ST27, while when not, the routine proceeds to step ST28.

Step ST27

The CPU 17 performs the reproduction processing explained in the above "Track Play" section.

Step ST28

The CPU 17 decides whether or not the play mode specified at step ST23 is unit play. When deciding that it is unit play, the routine proceeds to step ST29, while when not, the routine proceeds to step ST30.

Step ST29

The CPU 17 performs the reproduction processing explained in the above "Unit Play" section.

Step ST30

The CPU 17 decides whether or not the play mode specified at step ST23 is track shuffle. When deciding that it is track shuffle, the routine proceeds to step ST31, while when not, the routine proceeds to step ST32.

Step ST31

The CPU 17 performs the reproduction processing explained in the above "Track Shuffle" section.

Step ST32

The CPU 17 decides whether or not the play mode specified at step ST23 is unit shuffle. When deciding that it is unit shuffle, the routine proceeds to step ST33, while when not, the routine returns to step ST21.

Step ST33

The CPU 17 performs the reproduction processing explained in the above "Unit Shuffle" section.

As explained above, according to the reproduction apparatus explained using FIGS. 6 and 7, the first level music selection screens D1_1 to D1_5 can be switched by a short pressing action of the MODE key 25 shown in FIG. 2A and the first level music selection screen D1 can be switched to the second and third level music selection screen D1 by a short pressing action of the right direction key 27a.

Therefore, even if reducing the number of the levels of the music selection screen D1 from the related art, the user can select the music data by using the music selection screen classified based on a number of attributes greater than the number of the levels. Due to this, the user operation can be made simpler.

At that time, since the MODE key 25 having the above function is arranged at the right from the center of the side face 1d of the housing of the reproduction apparatus 1 as shown in FIG. 2A, the user can hold the reproduction apparatus 1 in his or her right hand and switch among the first level music selection screens D1_1 to D1_5 by the forefinger by a simple operation. Namely, by providing the MODE key 25 exclusively for switching the music selection screen D1 by a short pressing action, the switching operation of the music selection screen D1 can be performed without the number of operation keys reducing the operability and with a fewer number of operations.

Further, as explained above, the level of the music selection screen D1 is shifted by using the right direction key 27a and the left direction key 27b arranged at upper right side of the center of the front 1c, so it is possible to easily link upward and downward shifts of level with user operations. At that time, the user can operate the right direction key 27a and the left direction key 27b by using his or her thumb and therefore operate the MODE key 25, the right direction key 27a, and the left direction key 27b by one hand to change the music selection screen D1.

Due to this, a user's operation for changing the music selection screen D1 can be made simpler and the desired music data can be selected and reproduced by a simplified operation of the user.

Further, according to the reproduction apparatus 1, if the MODE key 25 is pressed for a short time on the second or third level music selection screen D1, the music selection screen D1 is shifted to the first music selection screen D1 corresponding to the music selection screen D1. Due to this, if the user mistakes the attribute of the first music selection screen D1, the user also can select the first music selection screen D1 having other attributes by a simple operation.

In the reproduction apparatus 1, if the execute key 27e is pressed for a short time during display of the music selection screen D1, the music data stored in the HDD 13 may be selected and reproduced in a predetermined order of reproduction based on the items displayed on the music selection screen D1 at that time and the selected play mode.

Therefore, the reproduction apparatus 1 can reproduce music data having attributes corresponding to the music selection screen D1 in which the user is interested in various play modes.

In the reproduction apparatus 1, as shown in FIG. 2A, the VOLUME key 26 is arranged furthest toward the end 1b of the side face 1d of the housing and made larger in area than the MENU key 24 and the MODE key 25, so if operating the VOLUME key 26 by a finger without viewing the LCD panel 14, the operability can be improved.

The present invention is not limited to the above embodiments. The above embodiments are illustrated with reference to the case of applying the present invention to a portable audio player, but the present invention can also be applied to a personal computer or other apparatus other than a portable type.

Further, the recording means used for storing content data may be an MD (trademark) or other magneto-optical recording medium, a recordable CD (CD-R), a recordable DVD (DVD-R), or other optical recording medium or a memory stick (trademark), SD card (trademark), or other semiconductor memory instead of the HDD 13 shown in FIG. 1.

Further, the above embodiments were illustrated with reference to music data or other audio data as content data, but the invention may also be used with video, photo, or other image data.

Furthermore, the above embodiments were illustrated with reference to a portable type audio player as the reproduction apparatus 1, but the reproduction apparatus 1 may also be a personal computer or a compact disk or other optical disk player or other magneto-optical disk player.

The invention is also not limited to the positions and the shapes of the operation keys shown in FIGS. 2A to 2C and the LCD panel 14.

Summarizing the industrial applicability of the invention, the present invention can be applied to a system selecting desired content data from a plurality of content data based on its attributes.

It should be understood by those skilled in the art that various modifications, combinations, sub-combinations and alterations may occur depending on design requirements and other factors in so far as they are within scope of the appended claims or the equivalents thereof.

What is claimed is:

1. A reproduction apparatus for reproducing audio content data from an audio content among a plurality of audio contents, each of the plurality of audio contents having specific items defined for each of a plurality of different audio content attributes, the reproduction apparatus comprising:
    a display;
    a first operation key for instructing switching a current selection screen mode between a plurality of selection screen modes, each selection screen mode being associated with one of a plurality of audio content attributes, the plurality of audio content attributes comprising at least one of album, artist, or genre, each selection screen mode of the plurality of selection screen modes being associated with a different selection screen hierarchy, each of the selection screen hierarchies for the selection screen modes comprising a plurality of selection screens for displaying in the display information on the plurality of audio contents, the information displayed in a selection screen comprising items defined for audio content attributes for at least some of the plurality of audio contents;

a plurality of other operation keys for navigating within a current selection screen hierarchy for the current selection screen mode, the plurality of other operation keys comprising
  a second operation key for changing an indicated item in a current selection screen of the current selection screen hierarchy, the indicated item indicated by a cursor and associated with at least one audio content;
  a third operation key for instructing selection of the indicated item in the current selection screen and for changing the current selection screen to a different selection screen within the current selection screen hierarchy for the current selection screen mode;
  a fourth operation key for selecting audio content data for reproduction; and
a processor for:
  in response to operation of the first operation key, switching the current selection screen mode from a first selection screen mode to a second selection screen mode of the plurality of selection screen modes for displaying in the display the information regarding the plurality of audio contents, the first selection screen mode being associated with a first selection screen hierarchy different from a second selection screen hierarchy of the second selection screen mode, the first selection screen hierarchy comprising a first selection screen not in the second selection screen hierarchy and the second selection screen hierarchy comprising a second selection screen not in the first selection screen hierarchy,
  in response to an operation of the second operation key, moving the cursor within the current selection screen of the current selection screen hierarchy for the current selection screen mode from a first item to an item adjacent to the first item in the current selection screen;
  in response to an operation of the third operation key, when an item is indicated in the current selection screen, switching the display from the current selection screen to a next selection screen within the current selection screen hierarchy for the current selection screen mode; and
  in response to an operation of the fourth operation key selecting an indicated item in the current selection screen, displaying, on said display, a reproduction screen for displaying audio content data belonging to the indicated item and reproducing the selected audio content data,
  wherein when the current selection screen mode is the first selection screen mode, operation of the plurality of other operation keys for navigating within the current selection screen hierarchy cannot switch the display to the second selection screen of the second selection screen hierarchy for the second selection screen mode.

2. The reproduction apparatus as set forth in claim 1, wherein:
  said processor is held in a flat box-shaped housing;
  said first operation key is arranged at a first surface of the housing in a thickness direction toward one end from a center of the first surface;
  said display is arranged at a second surface perpendicularly adjoining the first surface toward an other end from the center of the second surface; and
  said third operation key is arranged toward one end from the center of the first surface.

3. The reproduction apparatus as set forth in claim 1, wherein said processor:
  switches from the first selection screen mode to the second selection screen mode and changes the display from a first top-level selection screen of the first selection screen hierarchy to a second top-level selection screen of the second selection screen hierarchy when the current selection screen mode is the first selection screen mode and said first operation key is operated during display of the first top-level selection screen on said display, and
  switches to the first top-level selection screen of the first selection screen hierarchy for the first selection screen mode when the current selection screen mode is the first selection screen mode and said first operation key is operated during display of the first lower-level selection screen of the first selection screen hierarchy on said display.

4. The reproduction apparatus as set forth in claim 1, wherein said processor switches the display to a first top-level selection screen of the first selection screen hierarchy for the first selection screen mode when the current selection screen mode is the first selection screen mode and said first operation key is operated during display of a screen other than a selection screen of the first selection screen hierarchy.

5. The reproduction apparatus as set forth in claim 1, wherein:
  said second operation key is any one of an up direction key, a down direction key, a right direction key, and a left direction key in a direction key;
  said third operation key is any one of the up direction key, the down direction key, the right direction key, and the left direction key in the direction key different than the second operation key; and
  said fourth operation key is an execute key positioned in a middle of the up direction key, the down direction key, the right direction key, and the left direction key.

6. The reproduction apparatus as set forth in claim 1, wherein said processor selects and reproduces audio content data for a plurality of audio contents in an order of reproduction determined at least in part in accordance with an order in which items for the plurality of audio contents are displayed on the current selection screen at a time said fourth operation key is operated.

7. The reproduction apparatus as set forth in claim 6, wherein said processor displays a menu screen when a fifth operation key is operated, displays a play mode selection screen selecting one play mode in a plurality of play modes with different orders of reproduction when play mode selection is selected on the menu screen, and selects and reproduces the audio content data for the plurality of audio contents further based on an order of reproduction corresponding to the play mode selected on the play mode selection screen.

8. The reproduction apparatus as set forth in claim 7, wherein the fifth operation key is arranged on a first surface toward a center from said first operation key.

9. The reproduction apparatus as set forth in claim 2, wherein a volume operation means adjusting a reproduction volume of the audio content data is arranged further toward the one end from said first operation means.

10. The reproduction apparatus as set forth in claim 1, further comprising a recording means for recording the audio content data.

11. A reproduction method for reproducing audio content data from an audio content for which specific items are defined for each of a plurality of different audio content attributes, the reproduction method comprising:
  in response to operation of a first operation key, switching a current selection screen mode from a first selection screen mode to a second selection screen mode of a plurality of selection screen modes, each selection screen mode being associated with one of a plurality of audio content attributes, the plurality of audio content attributes comprising at least one of album, artist, or genre, each of the plurality of selection screen modes being associated with one of a plurality of selection screen hierarchies for displaying in a display information regarding at least two audio contents available for reproduction, the information displayed in a selection screen comprising items defined for audio content attributes for the at least one audio content, wherein a first selection screen hierarchy for the first selection screen mode comprises a first selection screen not present in a second selection screen hierarchy for the second selection screen mode and the second selection screen hierarchy comprising a second selection screen not present in the first selection screen hierarchy;

in response to an operation of a second operation key for navigating within a current selection screen hierarchy for the current selection screen mode, moving a cursor within a current selection screen of the current selection screen hierarchy from a first item to an adjacent item in the current selection screen, wherein the first item and the adjacent item are respectively associated with a first audio content and a second audio content of the at least two audio contents; and in response to an operation of a third operation key for navigating within the current selection screen hierarchy for the current selection screen mode, when an item is indicated by the cursor in the current selection screen, switching the current selection screen to a different selection screen within the current selection screen hierarchy for the current selection screen mode; wherein the item indicated by the cursor is associated with an audio content of the at least two audio contents, wherein when the current selection screen mode is the first selection screen mode, operation of the second and third operation keys for navigating within the current selection screen hierarchy cannot switch the display to the second selection screen of the second selection screen hierarchy for the second selection screen mode.

12. A reproduction apparatus for reproducing audio content data for which specific items are defined for each of a plurality of different audio content attributes, the reproduction apparatus comprising:

a display;

a first operation key instructing switching a current selection screen mode between a plurality of selection screen modes, each selection screen mode being associated with one of a plurality of audio content attributes, the plurality of audio content attributes comprising at least one of album, artist, or genre, each selection screen mode of the plurality of selection screen modes being associated with a different selection screen hierarchy, each of the selection screen hierarchy for the selection screen modes comprising a plurality of selection screens for displaying in the display information on the plurality of audio contents, the information displayed in a selection screen comprising items defined for audio content attributes for at least two audio contents;

a plurality of other operation keys for navigating within a current selection screen hierarchy for the current selection screen mode, the plurality of other operation keys comprising a second operation key for changing an indicated item in a current selection screen of the current selection screen hierarchy, the indicated item indicated by a cursor and associated with an audio content of the at least two audio contents;

a third operation key instructing selection of the selected item in the current selection screen and for changing the current selection screen to a different selection screen within the current selection screen hierarchy for the current selection screen mode; and a processing unit for:

in response to operation of the first operation key, switching the current selection screen mode from a first selection screen mode to a second display selection screen mode of the plurality of selection screen modes for displaying in the display the information regarding the at least two audio contents, the first selection screen mode being associated with a first selection screen hierarchy that includes a first selection screen not in a second selection screen hierarchy of the second selection screen mode and the second selection screen hierarchy including a second selection screen not in the first selection screen hierarchy, in response to an operation of the second operation key, moving the cursor within the current selection screen of the current selection screen hierarchy from a first item to an adjacent item in the current selection screen; and in response to an operation of the third operation key when an item is indicated by the cursor in the current selection screen, switching the current selection screen to a next selection screen within the current selection screen hierarchy for the current selection screen mode, wherein when the current selection screen mode is the first selection screen mode, operation of the plurality of other operation keys navigating within the current selection screen hierarchy cannot switch the display to the second selection screen of the second selection screen hierarchy for the second selection screen mode.

13. The reproduction apparatus as set forth in claim 12, wherein the first selection screen mode is associated with an audio content attribute that is one of artist, album, or genre.

14. The reproduction apparatus as set forth in claim 13, wherein the current selection screen displays a plurality of items for a predetermined audio content attribute, and wherein the plurality of items comprises artist names when the predetermined audio content attribute is artist, album names when the predetermined audio content attribute is album, and genres when the predetermined audio content attribute is genre.

15. The reproduction apparatus as set forth in claim 11, wherein the first selection screen mode is associated with an audio content attribute that is album and the first selection screen displays a first plurality of items, where each of the first plurality of items is an album name.

16. The reproduction apparatus as set forth in claim 11, wherein the first selection screen mode is associated with an audio content attribute that is artist and the first selection screen displays a first plurality of items, where each of the first plurality of items is an artist's name.

17. The reproduction apparatus as set forth in claim 11, wherein the first selection screen mode is associated with an audio content attribute that is genre and the first selection screen displays a first plurality of items, where each of the first plurality of items is a name of a genre.

* * * * *